(12) United States Patent
Cheng et al.

(10) Patent No.: US 10,680,530 B2
(45) Date of Patent: Jun. 9, 2020

(54) POWER SUPPLY CONTROL

(71) Applicant: Vicwood Prosperity Technology Limited, Hong Kong (HK)

(72) Inventors: Ka Wai Eric Cheng, Hong Kong (HK); Man Yau Law, Hong Kong (HK); Hin Hung Ng, Hong Kong (HK)

(73) Assignee: Vicwood Prosperity Technology Limited, Hong Kong (HK)

( * ) Notice: Subject to any disclaimer, the term of this patent is extended or adjusted under 35 U.S.C. 154(b) by 0 days.

(21) Appl. No.: 16/278,761

(22) Filed: Feb. 19, 2019

(65) Prior Publication Data

US 2019/0190395 A1 Jun. 20, 2019

Related U.S. Application Data

(63) Continuation-in-part of application No. 15/570,680, filed as application No. PCT/IB2016/052474 on May 2, 2016, now Pat. No. 10,211,623.

(30) Foreign Application Priority Data

Apr. 30, 2015 (HK) .................................. 15104207

(51) Int. Cl.
  *H02M 5/293* (2006.01)
  *H02M 1/08* (2006.01)
  *G05B 19/042* (2006.01)

(52) U.S. Cl.
  CPC .......... *H02M 5/293* (2013.01); *G05B 19/042* (2013.01); *G05B 19/0428* (2013.01); *H02M 1/08* (2013.01); *G05B 2219/24015* (2013.01); *H02M 2005/2932* (2013.01)

(58) Field of Classification Search
  CPC ................... H02M 5/293; H02M 1/08; H02M 2005/2982; G05B 19/042; G05B 19/0428; G05B 2219/24015
  See application file for complete search history.

*Primary Examiner* — Robert L Deberadinis

(57) ABSTRACT

A power supply control apparatus comprising a controller, a load current monitor and power connection circuitry operable by the controller for controlling power supply from a power source to a load. The controller is to operate to receive an identification number from a load and to use the identification number to retrieve a set of stored reference electrical parameters of the load from a set of databases, to measure operational electrical parameters of the load, to compare measured electrical parameters with the reference electrical parameters, and to determine whether the load is fit for power supply with reference to outcome of comparison between the measured electrical parameters and the reference electrical parameters.

20 Claims, 9 Drawing Sheets

Figure 1:
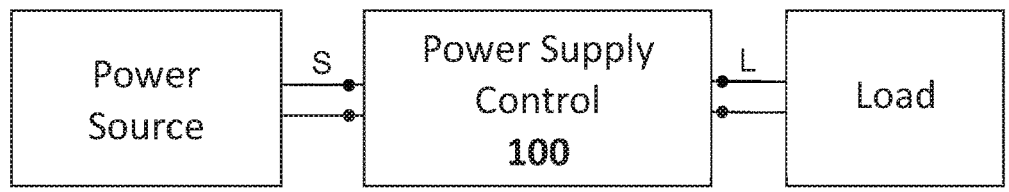

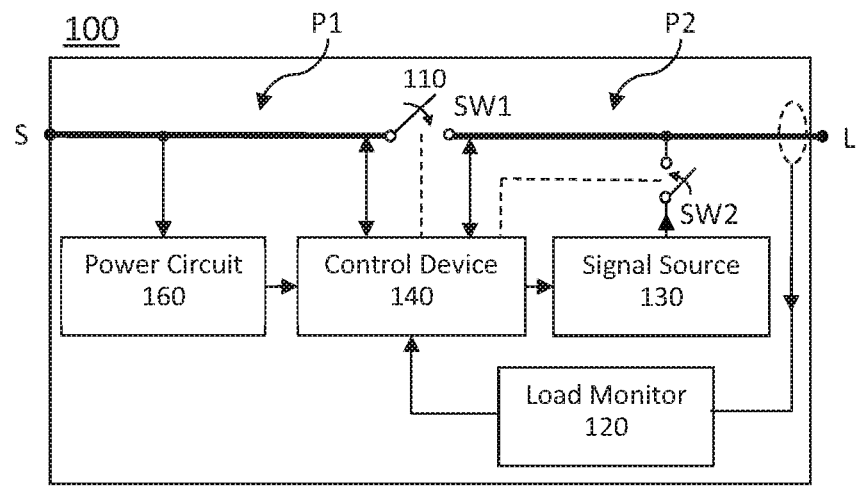
Fig. 2A
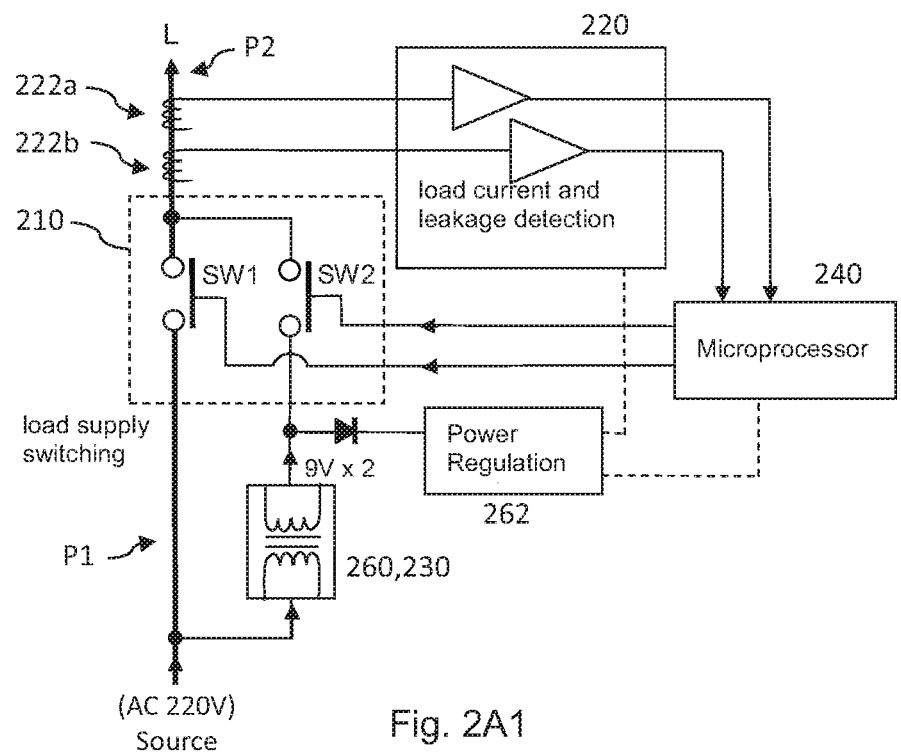
Fig. 2A1

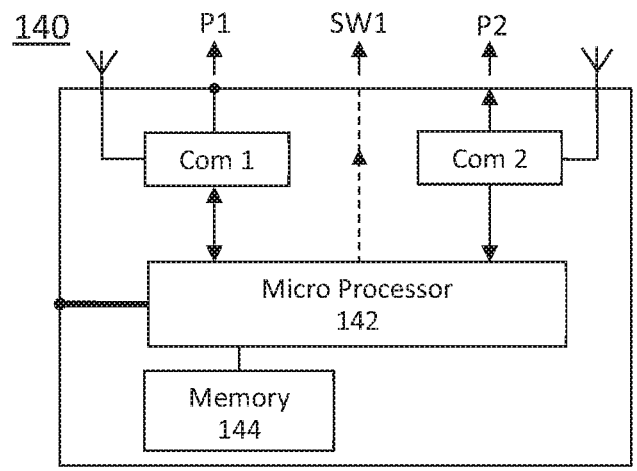
Fig. 2B
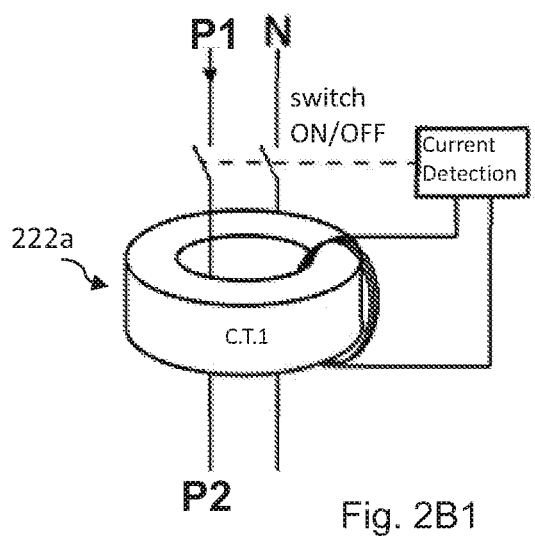
Fig. 2B1
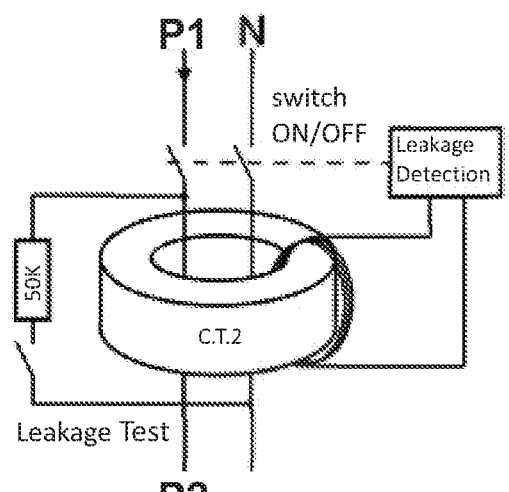
Fig. 2B2

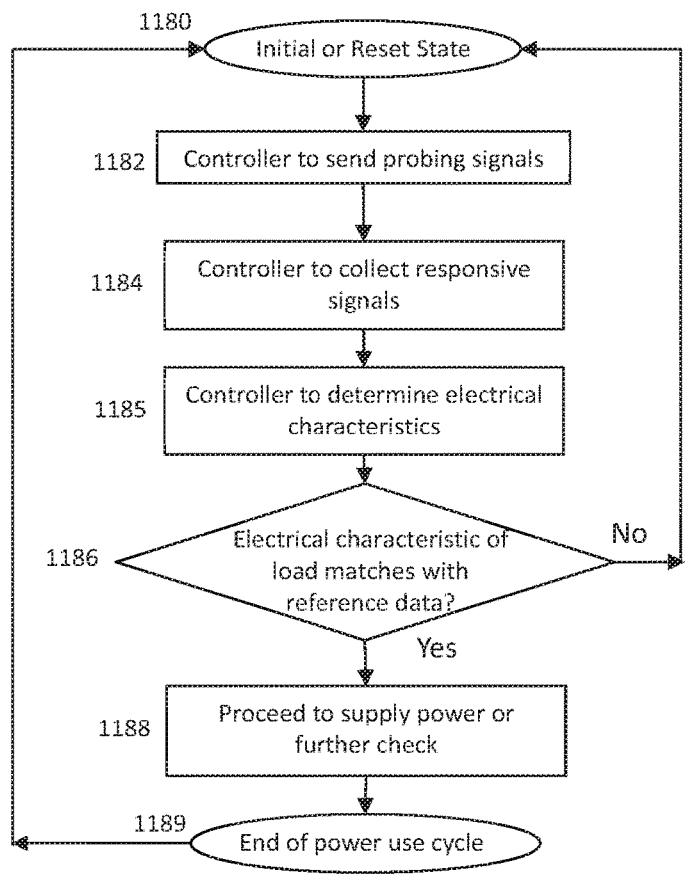
Fig. 2C
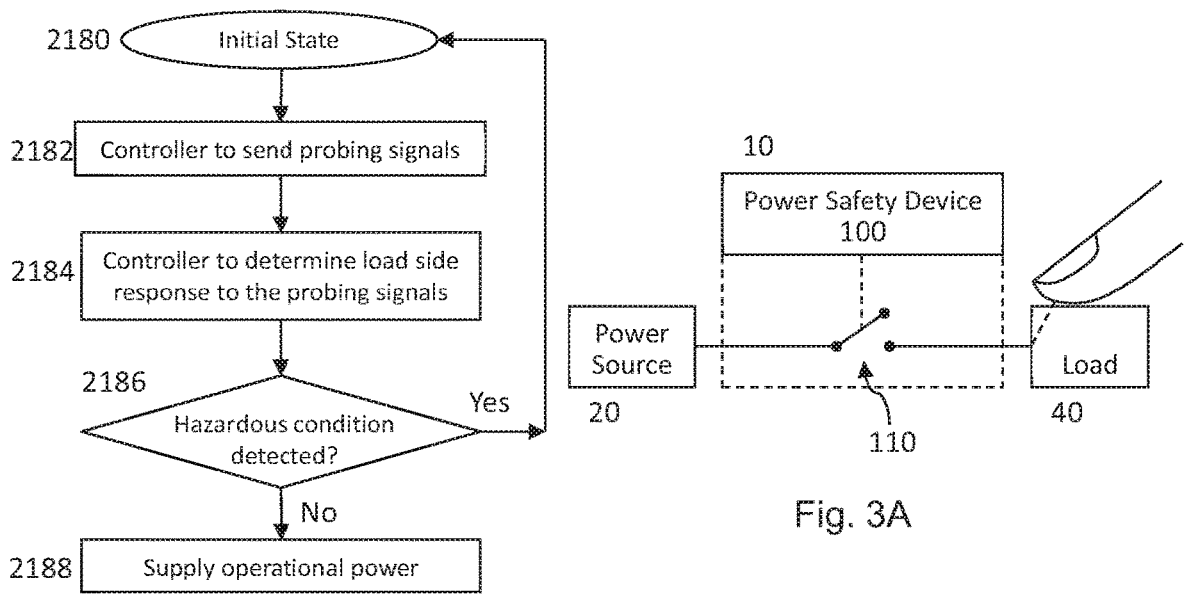
Fig. 3
Fig. 3A

POWER SUPPLY CONTROL

This application is a continuation-in-part application of United States patent application number U.S. Ser. No. 15/570,680, which was filed on Oct. 30, 2017 as a US national phase entry of international patent application PCT/IB2016/052474, which was filed on May 2, 2016 and claimed priority from a patent application 15104207.4 of Hong Kong SAR, China, which was filed on Apr. 30, 2015.

Electricity is used to power a lot of tools, equipment, apparatus and appliance. It is desirable if the supply of power can have enhanced features to mitigate unauthorised use of or hazardous operations.

A power supply control device comprises a controller and power connection circuitry. The power connection circuitry comprises a switchable power connection path between a source side and a load side. The power connection path is switchable to operate in a first operation state or an on-state in which state impedance between the source side and the load side is very low to permit flow of operation current through the power connection path, or a second operation state or an off-state in which state impedance between the source side and the load side is very high to impede flow of operation current through the power connection path. The controller is to operate to transmit at least one type of enquiry signals to the load side and to determine with reference to at least one type of received responsive signals whether a load on the load side is eligible for power supply connection. The controller is to switch the power connection path to the on-state or to maintain the power connection path to the on-state if the responsive signals indicate eligibility for power supply connection.

A power supply control device comprising a controller and power connection circuitry operable by the controller. The power connection circuitry comprises a switchable power connection path between a source side and a load side, and the power connection path is switchable to operate in a first operation state or an on-state in which state impedance between the source side and the load side is very low to permit flow of operation current through the power connection path, or a second operation state or an off-state in which state impedance between the source side and the load side is very high to impede flow of operation current through the power connection path. The controller is to operate to transmit enquiry signals to the load side and to determine with reference to load side responsive signals received from the load side in response to the enquiry signals whether a load on the load side is an admissible load eligible for power supply connection and whether there is living body contact on the load side. The responsive signals of an admissible load contain load identification data matched with or corresponding to reference load identification data stored in the controller or retrieved by the controller from an external data source. The controller is to switch the power connection path to the on-state or to maintain the power connection path in the on-state if the received responsive signals indicate admissibility or eligibility for power supply connection and no living body contact on the load side.

In some embodiments, the enquiry signals include a load identity enquiry signal, and the controller is to transmit the load identity enquiry signal as a request for identification by way of communication protocols, and the responsive signals in response to the request for identification contain load identification information; and the controller is to determine whether the load identification information is matched with reference load identification information.

In some embodiments, the load identification information includes one or more of identity data, power factor, current rating, voltage rating, temperature rating, safety rating, ingress protection rating, approval status, security status, safety status, class status, or performance status.

In some embodiments, the load identification information is pre-stored in the load and the reference load identification information is stored in a memory device of the controller.

In some embodiments, reference load identification information of target loads, acceptable loads, non-excluded loads, unacceptable loads, or prohibited loads is stored in a memory device of the controller, and the controller is to collect load identification information from the load side and to determine whether a target load or non-hazardous load is on the load side; and the controller is to switch the power connection path to the on-state or to maintain the power connection path to the on-state if the responsive signals indicate connection of a target load, connection of a non-hazardous load, or connection of a non-excluded load on the load side.

In some embodiments, the enquiry signals include an electrical characteristics enquiry signal, and the responsive signals to the electrical characteristics enquiry signal contain electrical characteristics of the load; and the controller is to determine whether the electrical characteristics of the load are matched with reference electrical characteristics to be admissible.

In some embodiments, the electrical characteristics include one or more of resistance, impedance, impedance-voltage variation, impedance-current variation, impedance-frequency variation, voltage-current variation, voltage-frequency variation, current-frequency variation, voltage-time variation, current-time variation, pulse response, step signal response, phase shift, and time constants.

In some embodiments, the enquiry signals include probing signals for determining whether there are variable electrical properties indicative of living body contact on the load side, and the controller is to keep the power connection path in the off-state or to switch the power connection path to the off-state if the responsive signals indicate living body contact on the load side.

In some embodiments, the controller is to operate to detect or monitor receipt of a request for power supply condition when the power connection path is in the off-state, the request for power condition including detection of a sudden drop of impedance on the load side or a communication protocol request and to transmit at least one type of enquiry signals after detection of a request for power condition.

In some embodiments, the power connection path comprises a first current conduction path on the source side, a second current conduction path on load side, and a power switching device interconnecting the first current conduction path and the second current conduction path. The power switching device is operable in a very high impedance off-state to impede flow of operation current between the first and second current conduction paths and a very low impedance on-state to permit flow of operation current between the first and second current conduction paths; and when the power switching device is in the on-state, the power connection path is in the on-state, and when the power switching device is in the off-state, the power connection path is in the off-state.

In some embodiments, the power connection circuitry is initially set in the off-state and to be set into the on-state if the outcome of determination is that the responsive signal contains, embeds or carries characteristic information of a target load, an acceptable load, and/or a non-excluded load, and/or no information indicating direct bodily contact of a human body or a living body, the characteristic information comprising one or more of the following: impedance, load characteristic, identity information, of a target load, acceptable load, and/or non-excluded load.

In some embodiments, the power connection circuitry is initially set in the off-state and is to maintain in the off-state if the outcome of determination is that the responsive signal contains, embeds or carries characteristic information of a non-target load, a non-acceptable load, and/or an excluded load, and/or information indicating direct bodily contact of a human body or a living body, the characteristic information comprising one or more of the following: impedance, load characteristic, identity information of a non-target load, a non-acceptable load, and/or an excluded load.

In some embodiments, the controller is to switch the power connection circuitry from the on-state to the off-state if the outcome of determination is that the responsive signal contains, embeds or carries characteristic information of a non-acceptable load, an excluded load, or information indicating direct bodily contact of a human body or a living body; and the characteristic information comprises one or more of the following: impedance, load characteristic, identity information of a non-acceptable load or of an excluded load.

In some embodiments, the power connection circuitry is to remain in the off-state and/or to switch from the on-state to the off state if the responsive signal contains characteristic variable electrical characteristics of a living body including a human body; and the characteristic variable electrical characteristics include one of more of: a significant or substantial decrease of resistance with an increase in probing voltage in at least a range of probing voltages, a significant or substantial decrease of impedance with an increase in probing voltage in at least a range of probing voltages, a significant or substantial decrease of resistance with an increase in probing frequency in at least a range of probing frequencies, a significant or substantial decrease of impedance with an increase in probing frequency in at least a range of probing frequencies, and a significant or substantial decrease of current or current density with increase in probing time.

A general-purpose power supply outlet apparatus comprising a power supply control device, a power inlet and a power outlet. The power control device comprises a controller and power connection circuitry operable by the controller. The power connection circuitry comprises a switchable power connection path between a source side and a load side, and the power connection path is switchable to operate in a first operation state or an on-state in which state impedance between the source side and the load side is very low to permit flow of operation current through the power connection path, or a second operation state or an off-state in which state impedance between the source side and the load side is very high to impede flow of operation current through the power connection path. The controller is to operate to transmit enquiry signals to the load side and to determine with reference to load side responsive signals received from the load side in response to the enquiry signals whether a load on the load side is an admissible load eligible for power supply connection and whether there is living body contact on the load side. The responsive signals of an admissible load contain load identification data matched with or corresponding to reference load identification data stored in the controller or retrieved by the controller from an external data source; and the controller is to switch the power connection path to the on-state or to maintain the power connection path in the on-state if the received responsive signals indicate admissibility or eligibility for power supply connection and no living body contact on the load side. The power inlet is connected to the source side and the power outlet is connected to the load side, and the power outlet is for receiving a standard power connector, and operational power is to flow from the source side through the power connection path to the load side when the source side is connected to a power source and the power connection path is in the on-state.

A method of supplying power from a source side to a load side. The method comprises: transmitting at least one type of enquiry signals or probing signals to the load side, determining from at least one type of responsive signals from the load side whether a target load or a non-hazardous load is on the load side, switching on power supply to the on-state or maintaining power supply to the load if the responsive signals indicate connection of a target device or connection, connection of un-acceptable load, connection of non-hazardous load on the load side.

A method of operating a power supply control device comprising a controller and power connection circuitry operable by the controller. The power connection circuitry comprises a switchable power connection path between a source side and a load side, and the power connection path is switchable to operate in a first operation state or an on-state in which state impedance between the source side and the load side is very low to permit flow of operation current through the power connection path, or a second operation state or an off-state in which state impedance between the source side and the load side is very high to impede flow of operation current through the power connection path. The method comprises the controller to operate to transmit enquiry signals to the load side and to determine with reference to load side responsive signals received from the load side in response to the enquiry signals whether a load on the load side is an admissible load eligible for power supply connection and whether there is living body contact on the load side. The responsive signals of an admissible load contain load identification data matched with or corresponding to reference load identification data stored in the controller or retrieved by the controller from an external data source; and to switch the power connection path to the on-state or to maintain the power connection path in the on-state if the received responsive signals indicate admissibility or eligibility for power supply connection and no living body contact on the load side.

In some embodiments, the enquiry signals include a load identity enquiry signal, and the controller is to transmit the load identity enquiry signal as a request for identification by way of communication protocols, and the responsive signals in response to the request for identification contain load identification information; and the controller is to determine whether the load identification information is matched with reference load identification information.

In some embodiments, the enquiry signals include an electrical characteristics enquiry signal, and the responsive signals to the electrical characteristics enquiry signal contain electrical characteristics of the load; and the controller is to determine whether the electrical characteristics of the load are matched with reference electrical characteristics to be admissible.

In some embodiments, the electrical characteristics enquiry signal are pulse signals, step signals, square signals, sinusoidal signals or saw tooth signals; and the electrical characteristics enquiry signal has a voltage amplitude of between 15V and 50V and a frequency of between 20 Hz to 150 Hz.

In some embodiments, the pulse signals, step signals, square signals are DC signals.

FIGURES

Figure 1A:
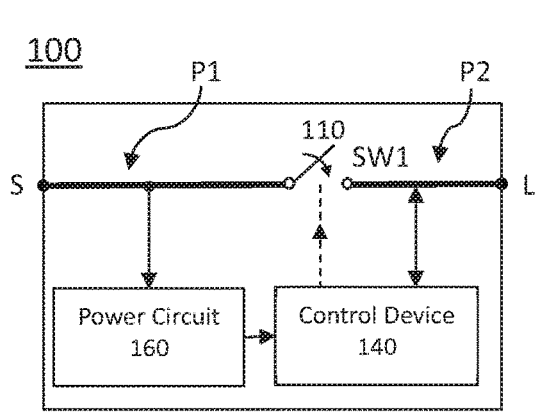
Figure 1B:
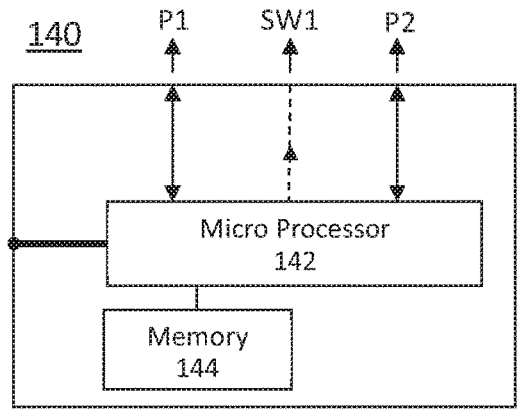
Figure 1C:
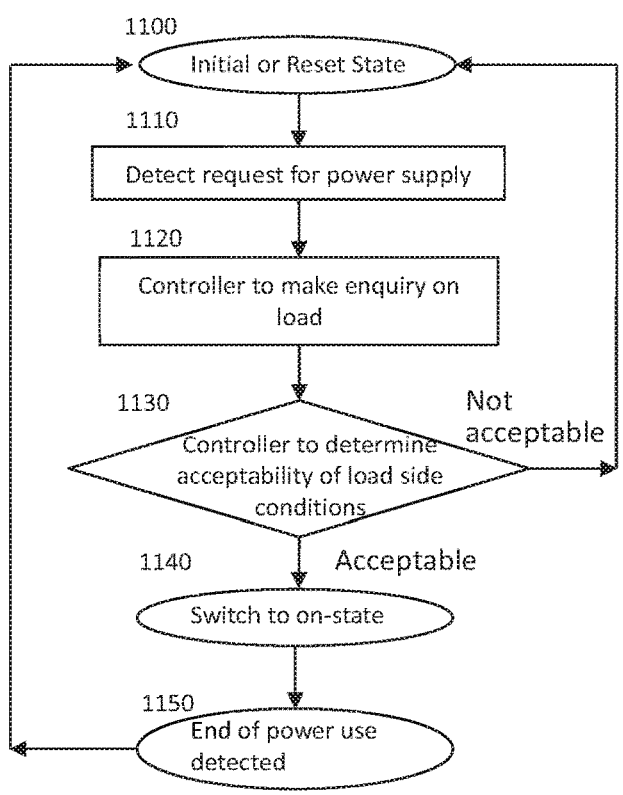
Figure 4:
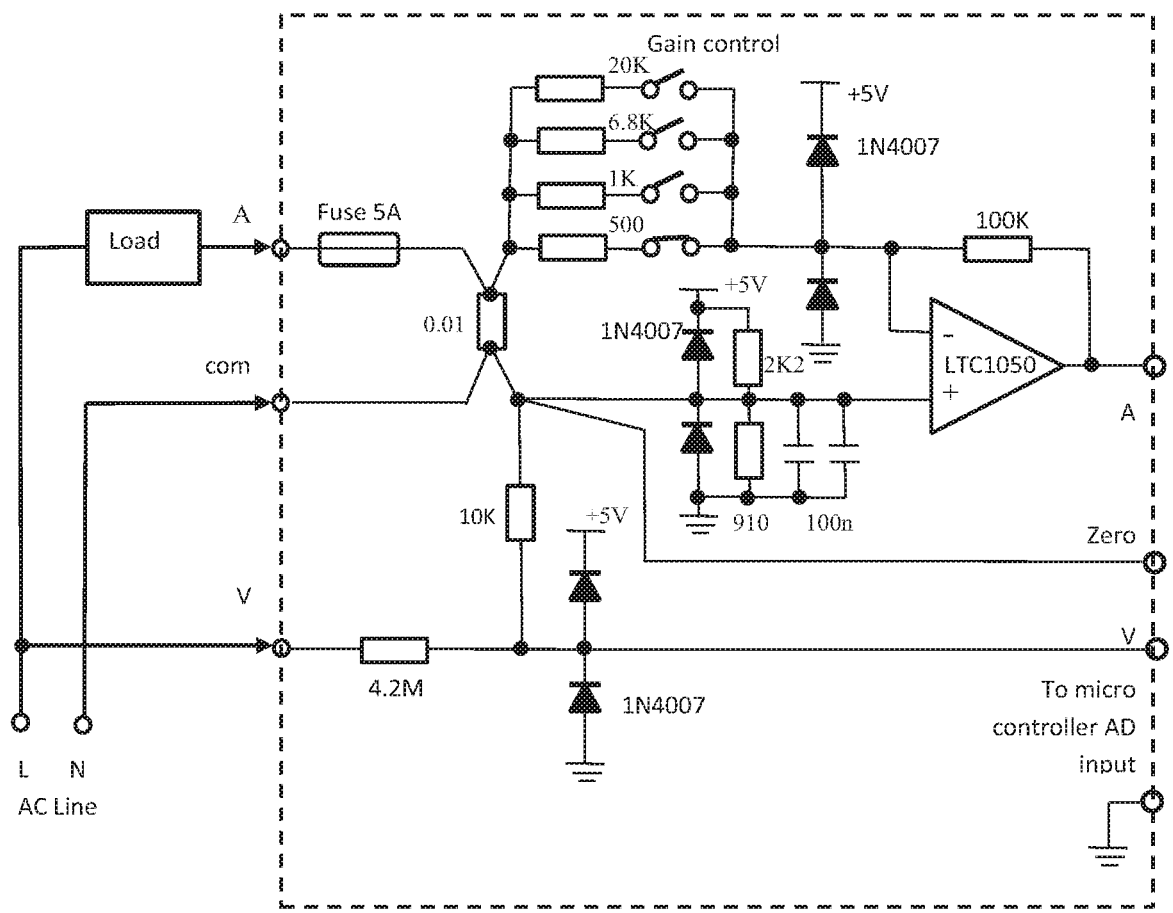
Figure 5A:
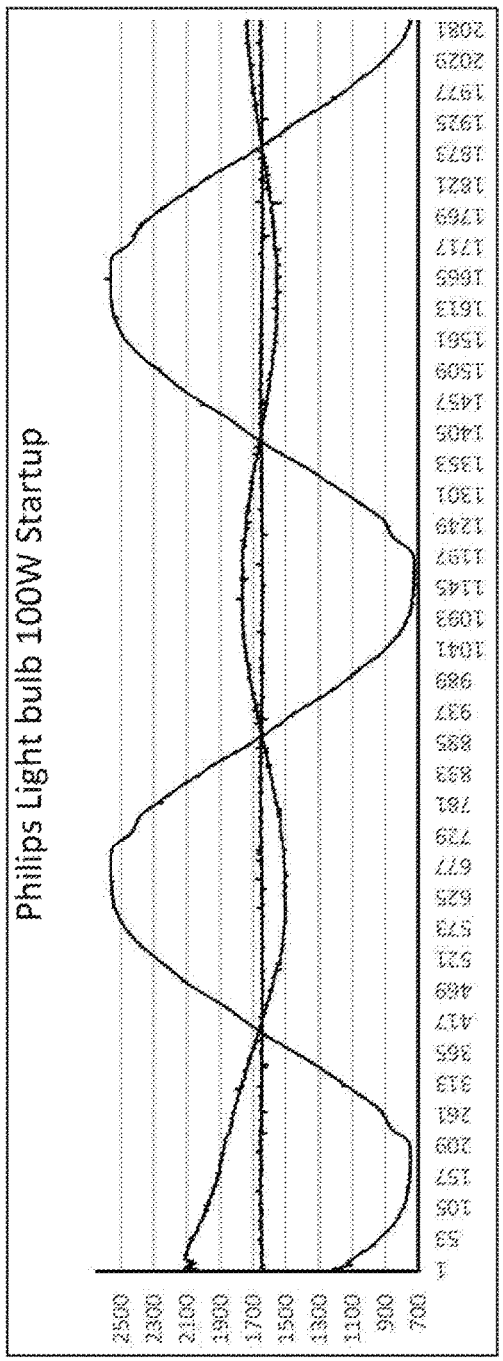
Figure 5B:
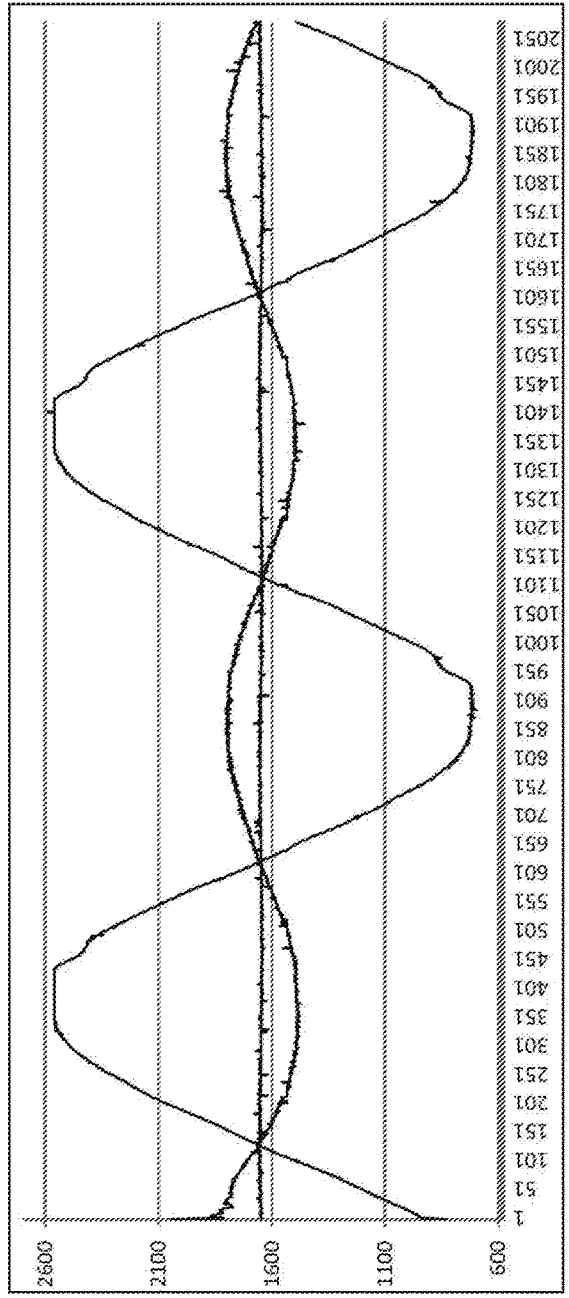
Figure 5C:
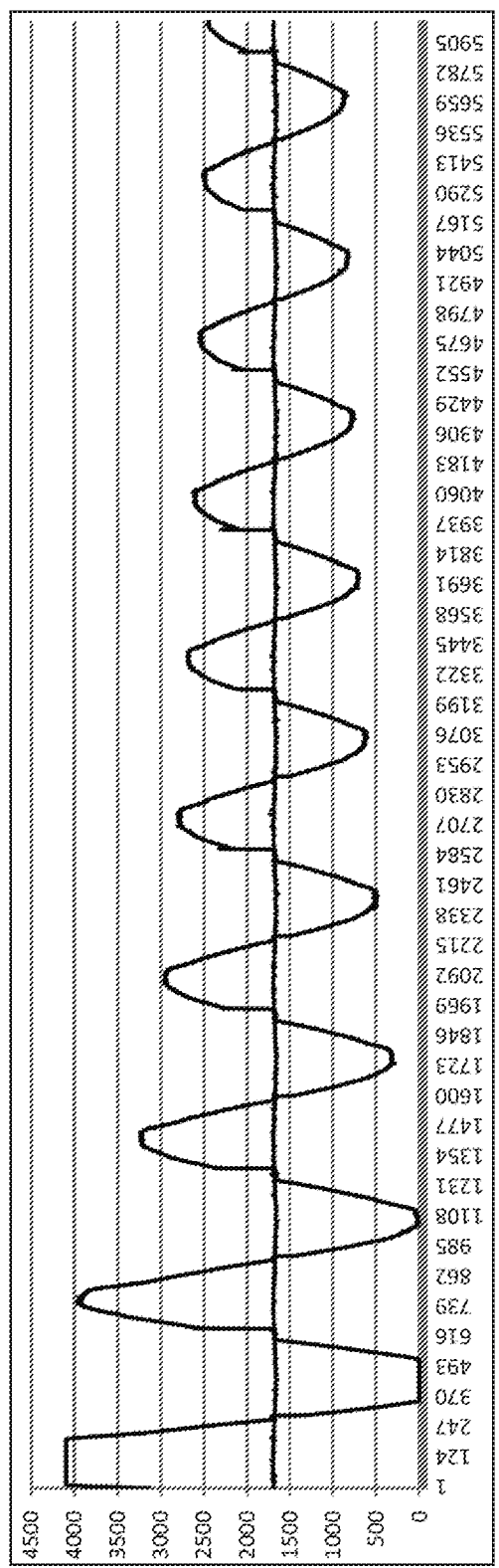
Figure 6A:
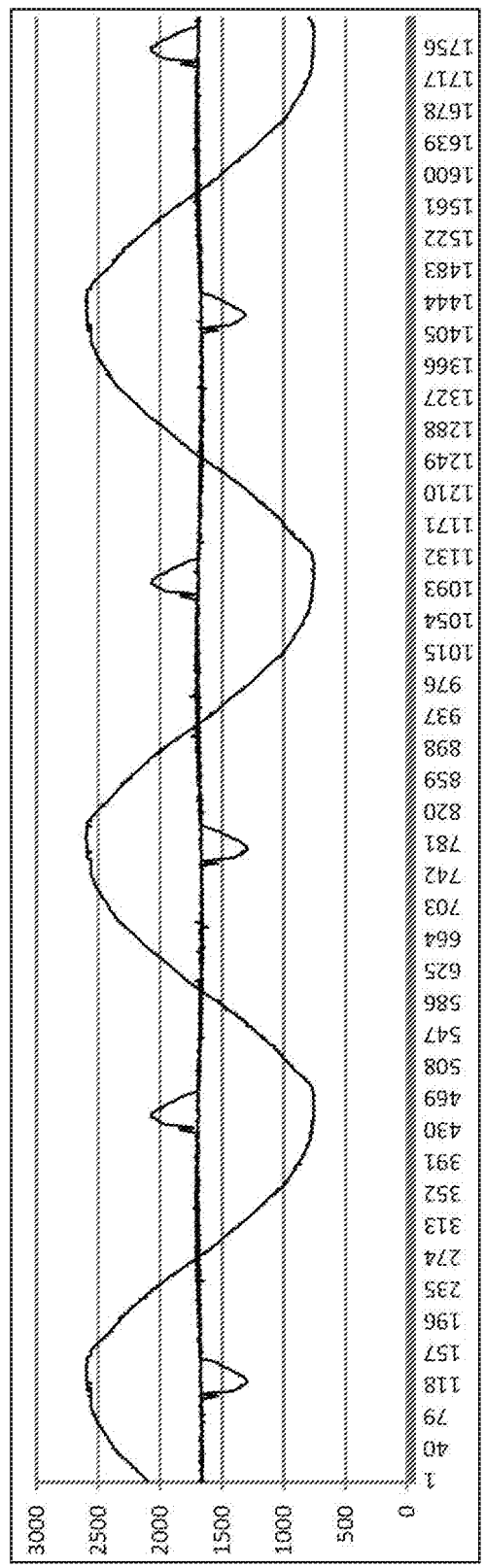
Figure 6B:
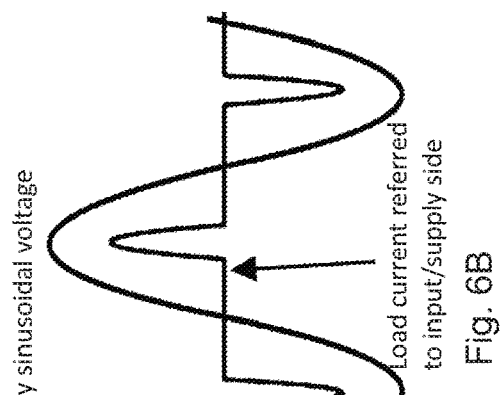
Figure 7:
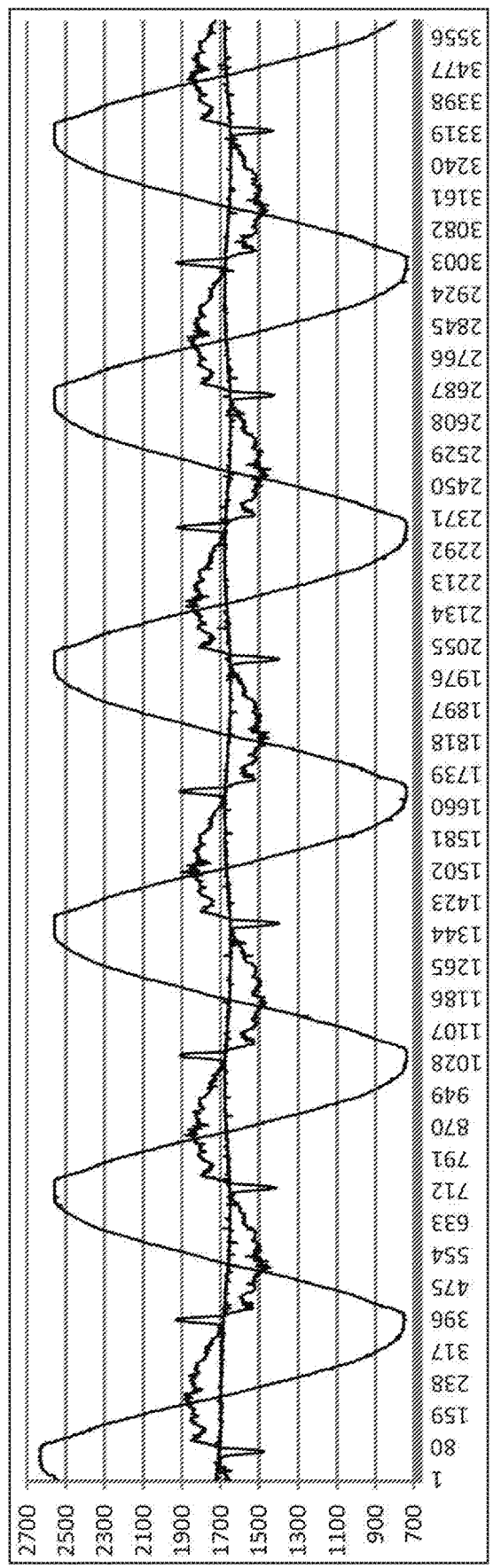
Figure 8:
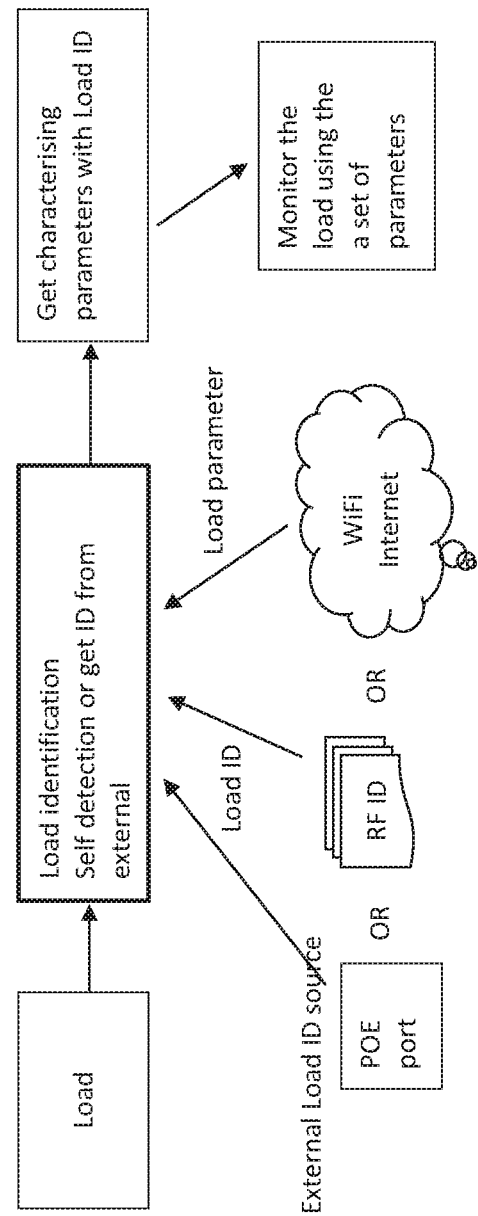

Example and example embodiments will be described with reference to the accompanying Figures, in which:

FIG. 1 is a block diagram of an example electrical system comprising a power supply control device of the present disclosure, FIG. 1A is a block diagram of an example a power supply control device of the present disclosure, FIG. 1B is a block diagram of an example control device of the power supply control device of FIG. 1A, FIG. 1C is a flow diagram depicting an example flow of operations of the example the power supply control device of FIG. 1A, FIG. 2A is a block diagram of an example a power supply control device of the present disclosure, FIG. 2A1 is an example hybrid block and circuit diagram of an example implementation of the power supply control device of FIG. 2A, FIG. 2B is a block diagram of an example control device of the power supply control device of FIG. 2A, FIGS. 2B1 and 2B2 are schematic diagrams depicting example signal collection devices of FIG. 2A1;

FIG. 2C is a flow depicting an example flow of operations of the power supply control device of FIG. 2A, FIG. 3 is a flow diagram showing partial example flow of operation of the power supply control device, FIG. 3A is a schematic diagram depicting living body contact on the load side, FIG. 4 is a schematic circuit diagram of an example load current monitor circuit, FIGS. 5A, 5B and 5C show example load current waveforms of example AC loads, FIG. 6A shows an example load current waveforms referred to the input side of an example DC load, FIG. 6B is a schematic diagram showing typical load current waveform referred to the input side of a typical DC load, FIG. 7 shows an example load current waveforms of an example complex load, and FIG. 8 is a schematic diagram of example network connection comprising a load monitor apparatus according to the disclosure.

DESCRIPTION

An example power supply control device 100 includes a first device side (or a source side S) which is for connection to a power source and a second device side (or a load side L) which is for connection to an electrical load, as depicted in FIG. 1.

The power supply control device 100 comprises a switching circuitry 110, a control device 140, a power connection circuitry and a power circuit 160, as depicted in FIG. 1A.

The power connection circuitry includes a first current conduction portion P1 which is connected to the first device side S, a second current conduction portion P2 which is connected to the second device side L, and a power switching device SW1 which is intermediate or which interconnects the first P1 and the second P2 current conduction portions. The power switching device SW1 is switchable between a first operation state of very low impedance and a second operation state of very high impedance. When the power switching device SW1 is in the very low impedance first operation state (or "ON state"), a very low impedance current conduction path is established between the first device side S and the second device side L. This current conduction path is to facilitate flow of operation current or operation power between the first device side S and the second device side L and forms a power connection path. When in this ON state, the first device side S and the second device side L are operationally connected for load operation, and operational current or operational power will flow through the power supply control device 100. When the power switching device SW1 is in the very high impedance second operation state (or "OFF state"), there is very high impedance between the first device side S and the second device side L. When in this OFF state, the first device side S and the second device side L are operationally disconnected, flow of operational current between the first device side S and the second device side L will be impeded. Where there is a current flow across the power supply control device 100 during this OFF-state, the current will be limited by the very high OFF-state impedance of the power switching device SW1 and the current will be limited to a non-operational load current or a non-hazardous current which is negligible and/or below a safety limit. An operational load current herein means a current of a magnitude which is intended or designated for a specific or designated load. For an electrical load, the operational load current may be the rated current or rated operation current of the load. The term "ON state" is interchangeably used with the terms "ON-state", "on state", "on-state", "closed state" and the term "OFF state" is interchangeably used with the terms "OFF-state", "off state", "off-state" or "open state" herein.

The control device 140 comprises a controller 142 and a memory device 144, as depicted in FIG. 1B. The controller 142 is to operate to control switching operations of the power switching device SW1 and the memory device 144 is for storing data and instructions for use by the controller 142. The controller 142 may be a processor, a microprocessor or a microcontroller which is to execute stored instructions to operate to switch the path interconnecting the source side S and the load side L from a very high impedance off-state to a very low impedance on-state and vice versa. The controller 142 comprises a plurality of control ports, data output ports and data output ports.

In example embodiments, the power supply control device 100 is operable in a 'standby mode' or a 'power supply mode'. When in the standby mode, the power switching device SW1 is in the off-state and the first current conduction portion P1 and the second current conduction portion P2 form a non-conductive path in so far as operation current is concerned. When in the power supply mode, the power switching device SW1 is in the on-state and the first current conduction portion P1 and the second current conduction portion P2 form a conductive path in so far as operation current is concerned.

Referring to FIG. 10, the power supply control device 100 is set in the standby mode when at an initial state 1100. At 1110, the controller 142 operates to monitor conditions on the load side L and determine whether a request for power supply condition has occurred. If a request for power supply condition has occurred and is detected by the controller 142, the controller 142 will at 1120 make enquiries to the load side to investigate whether the load on the load side is an admissible or acceptable load. To make the enquiries, the controller 142 will send one or more enquiry signals to the load side and await response signals from the load side L. At 1130, the controller will upon receipt of response signals of the load side determine whether the load connected to the load side is an admissible or acceptable load. If the load is found to be unacceptable or non-admissible, the controller 142 will refuse power supply to the load and return to the initial state and the power switching device SW1 is maintained in the off-state 1100. Alternatively, if the load is found to be admissible or acceptable, the controller 142 will at 1140 operate to switch on the power switching device SW1 to supply power to the load side L. When a power use cycle has ended at 1150, the controller will reset the power supply control device 100 to the initial state 1100 and await the next request for power supply. As an option, the controller 142 may operate to generate an alarm to alert users that the load is not-admissible or not-acceptable.

To determine whether there is a request for power supply condition on the load side, the controller 142 may continuously monitor the load side L and determine whether a change in electrical property representing a request for power supply condition has occurred on the load side L. For example, a sudden drop in load side impedance, indicating a switching on of a load on the load side, or connection of a switched-on load to the load side, may be taken as a request for power supply condition. Alternatively, a request for power supply may be made by way of a protocol communication between the controller 142 and a counterpart controller of the load. For example, protocol data of the protocol communication may be sent through the second current conduction portion P2 or by wireless transmission.

To determine whether the load on the load side is eligible, that is, admissible or acceptable for power supply, the controller will send one or more enquiry signals to the load side L and then determine whether the corresponding response signals received by the controller 142 contain information indicating eligibility of the load to receive power supply from the power source. For example, the controller 142 may send enquiry signals with an aim to determining whether the load is a target load, an acceptable load, a non-excluded load, an unacceptable load, or an excluded or prohibited load.

If the load is a target load, an acceptable load or a non-excluded load, the controller 142 may operate to switch on the power switching device SW1. Alternatively, if the load is an unacceptable load or an excluded or prohibited load, the power switching device SW1 will stay in the off-state and return to the initial state or standby state until a next request for power supply condition is detected. The controller may generate an alarm if a condition of non-admissibility or non-acceptability of load is detected, so that the load may be removed for repair or disposal, or security alerted.

To determine whether a load is eligible (that is, admissible or acceptable) for power supply, one or more eligibility criteria may be used.

An example criterion of eligibility is by way of identification enquiry. When this identification criterion is used, the controller 142 will obtain identification data of the load and check whether the identity of the load corresponds to the identity of a target load or an acceptable load. To obtain identification data of the load, the controller 142 may send a 'request for identification' by way of communication protocol to the load side and await load side response. A counterpart controller on the load connected to the load side will then send its identity data to the controller 142 and the controller will then verify acceptability. Alternatively, the counterpart controller on the load may be set to transmit identification data to the source side S upon connection or upon making a power supply request. The identification data may be sent to controller 142 the through the second current conduction portion P2 or by wireless transmission. In some embodiments, the controller 142 will determine eligibility of the target load with reference to the received identification information, for example, by determining whether the received identification information matches with identification information of a pre-stored eligible or target load.

In example embodiments, the power supply control device 100 is a built-in part of a general purpose power outlet, for example a general purpose power socket or wall outlet, the power supply control device 100 may operate to supply power to one or more eligible loads, for example, loads having identification data corresponding to particular or pre-determined electrical specifications or electrical characteristics such as power factor, current rating, voltage rating, temperature rating, safety rating, ingress protection ("IP") rating, or the like; or loads having pre-determined status, such as approval status, security status, safety status, class status, performance status, or the like. The identification criterion by way of identity matching would provide useful protection against misuse, unsafe or unauthorised use of tools, apparatus or equipment. The identification information of an admissible load or admissible loads may be pre-stored for subsequent verification at production, or may be subsequently downloaded by way of update from time to time after installation.

To obtain identification information of a target load, an acceptable load, a non-excluded load, an unacceptable load, an excluded or prohibited load, or other update data, the control device 140 may include a first communication interface COM 1 for data communication between the controller 142 and a data source via the first current conduction portion P1. To obtain identification data of a load, the control device 140 may include a second communication interface COM 2 for data communication between the load side counterpart controller and the controller 142 via the second current conduction portion P2.

The first communication interface COM 1 may comprise a power line communication ("PLC") modem to enable data communication through the first current conduction portion P1 which operate as a power supply line, or as an alternative or an additional option, by means of a wireless frontend such as a WiFi frontend, as depicted in FIG. 2B.

The second communication interface COM 2 may comprise a simple switch to facilitate direct data communication between the controller 142 and the counterpart controller on the load side L via the second current conduction portion P2, or may comprise a power line communication ("PLC") modem to enable data communication between the controller 142 and the counterpart controller on the load side L via the second current conduction portion P2, or as an alternative or an additional option, by means of a wireless frontend such as a WiFi frontend, as depicted in FIG. 2B. Where the controller 142 is required to perform pre-supply check via the second communication interface COM 2, the simple switch would suffice. Where the controller 142 is required to perform update checks via the second communication interface COM 2, for example, when power is being supplied to the load, the option of a PLC modem or a wireless frontend would be preferred for data communication since power isolation. As an example, the PLC modem may perform data communication with data modulated at say 10 kHz for transmission to the source side and at say 100 Hz or 250 Hz for transmission to the load side.

An example criterion of eligibility is by way of electrical characteristics enquiry. When this identification criterion is used, the controller 142 will obtain reference data of one or more electrical characteristics of the load and check whether the one or more electrical characteristics of the load on the load side correspond to the reference data.

In example applications of the electrical characteristics enquiry, electrical characteristics may be pre-stored in the load and retrievable by the controller 142 through cooperation with the counterpart controller of the load, for example, through data communication via the second communication interface COM 2. When a request for power supply condition has been detected, the controller 142 will operate to retrieve the pre-stored electrical characteristics from the load, for example, non-volatile memory of the load, for comparative evaluation.

In example applications, electrical characteristics of the load may be pre-stored in the own memory device 144 of the control device 140 and the controller 142 is to retrieve the pre-stored electrical characteristics for comparative evaluation when a request for power supply from the load side is detected and the identity of the load determined.

In example applications, electrical characteristics of the load are stored out of the power supply control device 100 but are retrievable by the controller 142 with reference to identification information of the load, for example, through data communication with an external data source.

The one or more electrical characteristics of the load that may be used for comparative evaluation may include: impedance, impedance-voltage variation, impedance-current variation, impedance-frequency variation, voltage-current variation, voltage-frequency variation, current-frequency variation, voltage-time variation, current-time variation, pulse response, step signal response, phase shift, time constants, or the like.

To determine the one or more electrical characteristics of the load for comparative evaluation with the reference data, the power supply control device 100 may additionally include a probing signal source 130 and a load monitor 120, as depicted in FIG. 2A. In example operations, the controller 142 is to operate the probing signal source 130 to generate probing signals and to transmit probing signals to the load side L by closing the switch SW2, for example, when the power switching device SW1 is OFF. Where the probing signal is a high frequency AC (alternate current) signal, a coupling capacitor may be connected in series with or to replace the switch SW2.

A probing signal may include one or more of: DC (direct current) voltage or current, of constant amplitude or variable amplitudes; AC voltage or current, of specific or variable frequencies and of constant amplitude or variable amplitudes; pulse signals or trains, of specific or variable periods and of constant amplitude or variable amplitudes; step signals, of specific or variable rise times and of constant amplitude or variable amplitudes. The probing source may include a sinusoidal signal generator or a signal generator which can be set to selectively generate square, sinusoidal or saw tooth probing signals without loss of generality.

The load monitor 120 is to collect responsive signals on the load side which are generated in response to the probing signals and comprises responsive signal collection devices. The responsive signal collection devices may include voltage and/or current sensing devices to collect voltage and/or current information on the load side.

In example operations as depicted in FIG. 2C, the controller 142 would operate the probing signal source 130 to transmit one of more probing signals or one or more types of probing signals to the load side at 1182, to collect data coming in from the load monitor 120 and representing responsive signals at 1184, to evaluate one or more electrical characteristics of the load using the collected responsive information at 1185, and to determine whether the one or more electrical characteristics of the load as determined from the collected responsive information match with the reference data of corresponding electrical characteristics at 1186. If the comparison at 1186 confirms matching, the controller 142 will close the power switching device SW1 to facilitate power flow to the load side at 1188. On the other hand, if the matching comparison fails, the controller 142 will return the power supply control device to the initial state of 1180 and maintain the power switching device SW1 in the off-state. At end of power use cycle at 1189, the controller 142 will return the power supply control device to the initial or reset state of 1180

Referring to FIG. 2A, the probing signal source 130 is for generating probing signals. The probing signal source 130 is operable to generate probing signals and is connected to the load side L by a probing signal switch SW2. The probing signal switch SW2 is switchable between a low impedance ON-state and a high impedance OFF-state. When the probing signal switch SW2 is closed, the probing signal switch SW2 is in the ON-state and probing signals generated by the probing signal source will flow to the load side L. When the probing signal switch SW2 is opened, the probing signal switch SW2 is in the OFF-state and probing signals generated by the probing signal source will not flow to the load side L.

So that the controller can obtain and process information or data to determine electrical characteristics on the load side, the controller will perform load probing operations. In example, load probing operations, the controller will operate the probing signal source to generate load probing signals to the load side and evaluate a response signal or a plurality of responsive signals received from the load side in response to the probing signal to determine one or more electrical characteristics of the load. During load probing operations, the probing signal switch SW2 is closed and the power switching device SW1 is opened, a probing signal path is established between the probing signal source 130 and the second current conduction portion P2, and probing signals generated by the probing signal source 130 flows to the load side L. During non-probing operations, the probing signal switch SW2 is opened, the probing signal path between the probing signal source 130 and the second current conduction portion P2 is disconnected to isolate the probing signal source 130 from the second current conduction portion P2, and probing signals generated by the probing signal source 130 do not flow to the load side L. In some examples, the probing signal switch SW2 can be part of the probing signal source 130.

The load monitor device 120 comprises detection circuitry which is arranged to collect electrical signals, in particular responsive signals, from the load side L. The detection circuitry may comprise signal processing circuitry such as shaping circuitry, amplification circuitry, filtering circuitry and other useful circuitry to process electrical signals collected from the load side L for subsequent output. In some embodiments, the detection circuitry may comprise decision circuitry to provide a decision output or a plurality of decision outputs upon receiving signals from the signal processing circuitry. In some embodiments, the detection circuitry comprises devices for collecting responsive signals on the load side. A responsive signal is one which is generated in response to a probing signal.

The control device 140 comprises control circuitry. The control circuitry comprises control device and/or control circuit arrangements which are arranged to manage and/or control operations of the power supply control device 100. The control circuitry may comprise a microprocessor, memory and peripheral circuitry such as input, output and control ports. The control device 140 is connected to the load monitor device 120 for receiving electrical signals originated from the load side L. The control device 140 is connected to control switching operations of both the power switching device SW1 and the probing signal switch SW2.

In example applications, the switching circuitry 110 comprising the power switching device SW1 and the probing signal switch SW2 is operatively controlled by the control device 140. For example, the control device 140 may operate or control the power switching device SW1 and the probing signal switch SW2 either individually or oppositely in synchronisation so that when one is turned on, the other is turned off. In some embodiments, the control device 140 may be connected to the probing signal source 130 to control its signal generation operations. Each of the power switching device SW1 and the probing signal switch SW2 may be implemented as solid state relays using MOSFET, thyristor or SCRs.

The power circuit 160 comprises power circuitry for supplying operation power to various components of the power supply control device 100. The power circuitry comprises power circuit arrangements such as transformers and power regulators which are arranged to supply regulated power supply to the power consuming components of the power supply control device 100 such as the load monitor device 120, the probing signal source 130 and/or the control device 140. An input of the power circuit 160 is connected to the first device side S and output of the power circuit 160 is connected to the power consuming components.

In example applications, the power supply control device 100 is connected to a power supply or a power source, with the first device side S connected to a power supply such as AC mains and the second device side L connected to a load, as depicted in FIG. 1. The load can be any electrical powered apparatus, appliance, equipment or tools. In example applications, the power supply control device 100 may be a built-in part of the power supply apparatus, for example, a general purpose power supply apparatus. In some example, the power supply control device 100 may be operated by a power source which is independent of the source side power supply.

In use, the power supply control device 100 is initially set to be in a stand-by mode. The power supply control device 100 will be subsequently set into a power operation mode when conditions on the load side L are found or determined to correspond to prescribed operation conditions or eligible admission conditions.

When in the standby mode, no current exceeding a safety threshold in time period and in amplitude is allowed to flow through the power supply control device 100 from the source side S to the load side L. To facilitate this, the power switching device SW1 is set into the OFF state when in the stand-by mode, and only to be switched into the operational mode subsequently after satisfactory determination of pre-scribed operation or admission conditions on the load side. When in the power operation mode, normal operational current exceeding the safety threshold time and current will be allowed to flow from the source side S to the load side L, and through the power supply control device 100. To facilitate this operation to allow flow of operational currents, the power switching device SW1 is set into the ON state when in the power operation mode.

In typical or example configurations, the power supply control device 100 is set into the standby mode each time when the power supply control device 100 is connected to an active power source and will remain in the standby mode until actuated to operate in the operational mode.

In typical or example configurations, the power supply control device 100 is reset into the standby mode after each use or completion of a cycle of power operation. A cycle of power operation means an operation current has flowed through the power supply control device 100 for a minimum operation duration and followed by a period of no operation current flow exceeding a predetermined threshold pausing period. An example threshold pausing period may be set to a few second or a few minutes.

When in the standby mode, the control device 140 will operate in a pre-power operation mode. During the pre-power operation mode, load side L electrical conditions are monitored and evaluated to determine whether there is a request for power supply condition. When a request for power supply condition has been detected, the control device 140 will operate to collect electrical signals from the load side and determine whether the collected electrical signals represent conditions of eligible admission on the load side. The pre-power operation is also referred herein as a pre-actuation mode or a monitoring mode.

In example or typical monitoring operations, the power switching device SW1 is in the OFF state, the probing signal switch SW2 is in the ON state and probing signals generated by the probing signal source will be transmitted to the load side as probing signals and to the control device 140 as reference signals. The control device 140 on evaluating the collected probing signal and upon comparison with or with respect to the reference signals would be able to determine whether electrical properties on the load side correspond to electrical properties of eligible operations.

While the power circuit 160 is connected to the source side S to obtain mains power supply for operation when in use, the power supply control device 100 may be DC operated, for example, by battery operation. Where the power supply control device 100 is DC operated, the power circuit may include DC-DC converters and/or DC-AC converters. In some applications, the power supply control device 100 may be dually both battery and mains operated without loss of generality.

An example power supply control device 200 of FIG. 2A1 comprises switching circuitry 210, a load monitor device 220, a probing signal source 230, a control device 240 and a power circuit 260. The power supply control device 200 includes the same functional components of the power supply control device 100 of FIG. 1A and the description thereon is incorporated herein mutatis mutandis where appropriate and with reference numerals increased by 100.

In the example power supply control device 200, the power circuit 260 comprises two 220 v-to-9 v transformers which are connected in series to form a 220 v-to-18 v transformer. Rectified output of the transformer is voltage regulated by a power regulation arrangement 262 comprising voltage regulators. The transformer output comprises two output paths, namely, a first output path of 18 v AC to serve as probing signals and a second output path connected to a full wave rectifier to supply DC power to operate components of the power supply control device 200. As shown in the circuit diagrams FIGS. 2A and 2A1, the rectified output is connected to a first voltage regulator 7808. The first voltage regulator 7808 comprises two outputs, namely, a first voltage output of 8V DC output for driving operational amplifiers (Op-amp) and a second voltage output connected to a second voltage regulator 7805 to provide a voltage output of 5V DC output for microprocessor and peripheral devices operation.

The load monitor device 120 comprises two current transformers 222a, 222b as example of signal collection devices. Connection of the current transformers 222a, 222b is depicted in more detail in FIGS. 2B1 and 2B2. Each of the current transformers 222a, 222b has a transformer ratio and rating of 5 A/5 mA.

The current transformer 222a (or first current transformer) is for detection of current flowing through the second current conduction portion P2. Although a single wire is shown in FIGS. 1 and 2, each of P1 and P2 actually comprises a live and neutral wire as depicted in FIGS. 2B1 and 2B2. The current transformer 222b (or second current transformer) is for detection of imbalanced current flowing through the second current conduction portion P2 and its associated neutral wire portion N. Hall effect transducers or other transducers may be used alternatively.

It is known that the flow of electrical current exceeding a threshold level through the human body can cause electrical shock. Electrical shock can be hazardous and known adverse consequences of electrical shock on the human body include the causing of ventricular fibrillation, respiratory arrest, nerve damage, asphyxia, and burns. Ventricular fibrillation is known to be a main cause of fatal accidents by electrical shock in mains power supply environment.

A person is able to feel the flow of current when the current flowing through the human body reaches a "perception threshold". The typical perceptible threshold for an average human body is about 1 mA at the typical mains frequency of 50 Hz or 60 Hz.

When the current flowing through the human body reaches a "let go threshold", the current flow can cause involuntary muscle contraction or tetany. When this happens, an affected person would not be able to voluntarily control muscles to release grip on a dangerously electrified object and this can result in prolonged contact with the electrified object. A prolonged exposure to a shock current at or around the let-go threshold can cause bodily damage. The typical "let go threshold" for women is between 5 mA and 7 mA and between 7 mA and 10 mA for men. For a person of 68-Kg (150-lb) weight, a typical "let go threshold" current is about 10 mA. The typical "let go threshold" for an average human body at the typical mains frequency is usually taken to be about 10 mA.

When the current flowing through the human body reaches a "ventricular fibrillation threshold", ventricular fibrillation will occur. The typical ventricular fibrillation threshold or an average human body is about 100 mA at the typical mains frequency. The actual ventricular fibrillation threshold depends on physiological parameters such as anatomy of the body, state of cardiac function, etc. as well as on electrical parameters such as duration and pathway of current flow.

Low frequency alternating current (AC) in the frequency range of between 15-100 Hz, for example at 50 Hz or 60 Hz, is considered to be more dangerous than direct current (DC) or high frequency AC, since the ventricular fibrillation threshold is considerably lower if the current flow is prolonged beyond one cardiac cycle. At these low frequencies, the let-go threshold is relatively low and the shock current can easily exceed the let-go threshold while not delivering enough initial energy to expel the person away from the source.

A current higher than the ventricular fibrillation threshold which passes through a human body can likely cause nerve or tissue damage, burns and death.

Optional safety features are incorporated in a power supply control of the present disclosure to enhance user safety and/or mitigate the risk of hazardous shock.

To enhance user safety and/or mitigate the risk of hazardous shock, variable electrical characteristics of a living body such as a human body or an animal body are utilised.

Characteristic electrical properties of a living body that are known to be variable ("variable electrical characteristics" or "variable electrical properties") include, for example:—
a) Impedance and resistance of the human body is not constant and varies with touching voltage.
b) Impedance of the human body is not constant and varies with frequency of touching voltage.
c) Impedance of the human body is not constant and varies with duration of current passage.

It is further noted that i) the resistance and/or impedance of a human body decreases with increasing frequency, ii) the resistance and/or impedance of a human body decreases with increase in touch voltage, iii) the rate of decrease of impedance with increase in touch voltage frequency is dependent on the touch voltage, iv) the rate of decrease of impedance with increase in touch voltage frequency is higher for a lower touch voltage and lower for a higher touch voltage, v) touch current density at a touch voltage decreases with touch time, and vi) touch current density at a touch voltage decreases more rapidly during an initial touch and decreases at a substantially slower rate after the initial touch period. The abovementioned properties are jointly and severally referred to as "characteristic variable electrical properties of a living body" herein and each variable property is referred to as a "characteristic variable electrical property of a living body" without loss of generality.

Electrical properties of the human body are discussed in the standard document PD 6519-1: 1995 and IEC 479-1: 1994 published by the BSI (British Standards Institute) (the "IEC document"). The document, or its updates and equivalents, is incorporated herein by reference.

Although the human body is usually modelled as an RC ladder network comprising both resistive ("R") and capacitive ("C") characteristics. Because of the capacitive characteristics, the total body impedance is expected to decrease with increase in frequency. However, it is noted that the human model is not a straightforward RC ladder network in which the values of the resistive component elements and/or the values of the capacitive component elements are constant or will stay constant on contact with a touch voltage.

It is noted from Table 1 of the IEC document that the value of total body resistance decreases with increase in the magnitude of the touch voltage of the same frequency. Reported measurements have indicated that the total body resistance or impedance for the current path hand to foot is lowered than for a current path hand to hand by 10% to 30% as a reference.

It is noted from Tables 1 and 2 of the IEC that each of the value of the total body resistance and the value of the total body impedance decreases very rapidly when touch voltage of the same frequency is increased from a very low value to up to 200 volt, the rate of decrease is notably more rapid when touch voltage of the same frequency is increased from a very low value to up to 75 volt, and the rate of decrease is notably even more rapid when touch voltage of the same frequency is increased from a very low value to up to 50 volt.

It is noted that the initial body resistance and the initial body impedance of the human body is lower than the asymptotic values of Tables 1 and 2. The generally accepted initial body resistance and initial body impedance is about 500Ω. This initial body resistance limits the peak value of the current to flow through a human body at the moment when the touch voltage occurs. This initial body resistance functions to provide resistance against short pulsed shock by limiting the initial current peaks. The initial resistance $R_o$ depends mainly on the current path and to a lesser extent on the surface area of contact. For example, at a probing voltage of 10 v, an example human average impedance at 50 Hz is about 4-8 times of that at 2 kHz; at a probing voltage of 18 v, an example human average impedance at 50 Hz is about 4.8-13 times of that at 2 kHz; at a probing voltage of 25 v, an example human average impedance at 50 Hz is about 4.4 to 13 times of that at 2 kHz. In another perspective, the average impedance of a human body at 500 Hz (at probing voltages of 10 v, 18 v and 25 v) is only about 35-40% of that at 50 Hz, the average impedance (at probing voltages of 10 v, 18 v and 25 v) of a human body at 2 kHz is only about 13-15%% of that at 50 Hz and 35% of that at 500 Hz. For example, it has been observed that the average impedance (at probing voltages of 10 v, 18 v and 25 v) at 50 Hz is about 6-8 times of the impedance at 2 kHz, the impedance at 50 Hz is about 2.5-3 times of the impedance at 500 Hz, and the impedance at 500 Hz is about 3-4 times of the impedance at 2 kHz;

For example, touch current density exhibits a sharp fall during the initial 5 to 10 seconds of touch voltage exposure and the fall is substantially slower after the initial 5 to 10 seconds. For example, the rate of fall in the first 5 seconds is at least about 4 times faster than the fall in the next 5 seconds, that is, 6-10 seconds, and 10 times faster than the rate of fall after the initial 10 seconds.

It is further noted that the total body impedance decreases very rapidly when the frequency of the same touch voltage magnitude increases from 25 Hz to 5000 Hz (or 5 kHz). The decrease is more rapid in the frequency range of 50 Hz to 2500 Hz, and even more rapid in the frequency range of 50 Hz to 1000 Hz. It is noted that the most rapid rate of change of total body impedance occurs in the region of between 50 Hz and 150 Hz. For example, a drop of about 20% is observed when the frequency increases from 50 Hz to 100 Hz (i.e., approximately 2% per Hz), a total drop of 52% is observed when the frequency increases from 50 Hz to 500 Hz (i.e., approximately 1.2% per Hz). It is also noted that the drop at below 50 Hz and the drop at above 1000 Hz is slower than the drop between 50 Hz and 1000 Hz. These trends and properties of change are observed when the touch voltages are at 10 v and 25 v and believed to be quite comparable for touch voltages of between 10 v and 50 v, or up to 100 v.

Studies have shown that for AC current of between 15 Hz and 100 Hz, a body current magnitude of below 0.5 mA is not perceptible and a body current of between 0.5 mA and a safe perceptible body current-time limit is perceptible-and-safe. The perceptible body current-time limit is 10 mA for duration of above 2 seconds and is 200 mA minus a duration dependent decrement factor for duration at or below 2 seconds. For example, the perceptible body current-time limit is 10 mA for 2 seconds and 200 mA for 10 ms. A body current time exceeding the perceptible body current-time limit may reach the "let go threshold" and become hazardous.

For DC, the trends and characteristics are somewhat similar. For example, a body current magnitude of below 2 mA is not perceptible and a body current of between 2 mA and a safe perceptible body current-time limit is perceptible-and-safe. The perceptible body current-time limit is 10 mA for duration of above 2 seconds and is 200 mA minus a duration dependent decrement factor for duration at or below 2 seconds. For example, the perceptible body current-time limit is 30 mA for 2 seconds and 200 mA for 10 ms. A body current time exceeding the perceptible body current-time limit may reach the "let go threshold" and become hazardous.

The variable electrical properties noted herein are characteristic electrical properties which can be used to determine whether there is direct electrical contact of a human body or a living body on the load side.

A power supply control device of the present disclosure can provide additional measures to facilitate determination of a hazardous condition of a living body on the load side.

For example, the power supply control device of FIG. 2A can be adapted to detect whether there is living body on the load side and to prevent power supply if possible living body contact is detected. Referring to FIGS. 3 and 3A, a load 40 is initially connected to the power source 20 at 2180. At this stage, the power switching device SW1 is at the OFF state and no operational power will flow through the power connection circuitry. At 2182, the controller 144 sends one or more probing signals to the load side. At 2184, the controller collects responsive signals from the load side and determines electrical characteristics on the load side. At 2186, the controller determines electrical characteristics of a living body are detected. If living body is detected, the controller will not supply power and return to the initial state of 2180. If no living body is detected, the controller will proceed to 2188 to supply operation power.

For example, the flow of FIG. 3 comprising 2180 to 2188 may be optionally inserted before 1182 or 1188 of FIG. 2C, or before 1110 or 1140 of FIG. 1C.

In this application, the controller is to operate to transmit at least one type of probing signal to the load side when the power connection circuitry is in the off-state, and to evaluate and determine whether a response signal or a plurality of response signals from the load side contains at least one of a plurality of human characteristic responses indicative of direct electrical contact of a human body or a living body on the load side. The controller is to operate to switch the power connection circuitry from the off-state to the on-state if the responsive signals are determined to containing no indication or no reasonable indication of direct human or animal body contact on the load side.

One or more human body electrical properties, that is, characteristic variable electrical properties of a living body, and the associated characteristics may be used to determine whether the load side is safe. For example, one or more load side electrical properties and/or characteristics may be measured and/or determined to identify whether there is any characteristic electrical property indicative of living body contact:

Initial resistance on the load side (or load side resistance). The initial resistance may be measured or determined by applying a DC probing voltage on the load side and measuring the DC current response from the load side, or by applying a DC probing current on the load side and measuring the DC voltage response from the load side.

Initial impedance on the load side (or load side impedance). The initial impedance may be measured or determined by applying an AC probing voltage on the load side and measuring the AC current response from the load side, or by applying an AC probing current on the load side and measuring the AC voltage response from the load side.

Load side resistance change with change in DC voltage magnitude. The load side resistance change may be determined by applying a DC probing voltage of different voltage magnitudes to the load side and by measuring the DC current responses on the load side, or by applying a DC probing current of different current magnitudes to the load side and by measuring the DC voltage responses from the load side.

Load side impedance change with change in AC voltage magnitude. The load side impedance change with change in AC voltage magnitude may be determined by applying an AC probing voltage of the same frequency at different voltage magnitudes to the load side and by measuring the AC current responses on the load side, or by applying an AC probing current of the same frequency and different current magnitudes to the load side and by measuring the AC voltage responses from the load side.

Load side impedance change with change in AC frequency. The load side impedance change with change in AC frequency may be determined by applying an AC probing voltage of a constant voltage magnitude at different frequencies to the load side and by measuring the AC current responses on the load side, or by applying an AC probing current of a constant current magnitude at different frequencies to the load side and by measuring the AC voltage responses on the load side.

The load side electrical properties and/or characteristics of (a) to (e) above can be determined, for example, by applying an probing voltage of a plurality of voltage magnitudes at a plurality of frequencies (from DC to a selected upper AC frequency) to the load side and by measuring the corresponding DC and AC current responses on the load side, or by applying an AC probing current of a plurality of current magnitudes at a plurality of frequencies to the load side and by measuring the corresponding DC and AC voltage responses on the load side.

The load side electrical properties and/or characteristics obtained are then compiled and evaluated to determine whether there is a good likelihood of human body or living body direct contact on the load side. The determination may be with reference to one or more human body electrical properties or the associated characteristics.

The probing current may be selected to be one that is non-perceptible. The probing current may be selected to be one that is perceptible-and-safe. A perceptible-and-safe probing current would provide indication to a user of a potential electrical shock hazard of the load. Where a larger probing current is required or preferred, the probing current may be selected to be in the perceptible-and-safe region or between the perceptible-and-safe limit and the "let go threshold". The probing signal source may include a current source or a current limiter to control the probing current magnitude.

To facilitate measurements of change with respect to change in frequency, the probing signal source would comprise a signal generator to generate AC probing signal. For example, the probing signal source may comprise a signal generator to generate AC probing signals of a plurality of frequencies. The probing signal frequency may span across a wide spectrum in order to assist observation of noticeable changes. For example, the frequency range may be selected between DC to 10 kHz, DC to 5 kHz, or DC to 2.5 Hz. A plurality of discrete AC frequencies may be used as probing frequencies, for example, 25 Hz, 50 Hz, 60 Hz, 100 Hz, 200 Hz, 500 Hz, 1 kHz, or 2 kHz. In an example, a set of probing frequencies comprising 50 Hz, 500 Hz and 2 kHz is used. The probing frequencies may be selected to define or correspond to regions of different electrical properties, for example, different rates of change of electrical properties characteristic of a human or a living body when subject to electrical touch.

For example, the probing frequencies may be selected to define or correspond to regions of slow change, medium change, and rapid change characteristics of a human or a living body. The measured properties are then compared with corresponding characteristics of a human or a living body to determine whether there is a reasonable likely of human body contact on the load side.

The probing voltage may be selected to correspond to a probing current which is non-perceptible to human. The probing voltage may be selected to correspond to a probing current which is perceptible-and-safe. Where a larger probing current is required or preferred, the probing voltage may be selected to correspond to a probing current which is in the perceptible-and-safe region or between the perceptible-and-safe limit and the "let go threshold". The probing signal source may include a voltage source and/or a current limiter to control the probing current magnitude to the load side.

The resistance or impedance of an electrical current path comprising a human body in series with a power supply can range from a minimum of around 500Ω to 800Ω to several hundred kΩ (kilo-ohm) or multiple MΩ or mega-ohm, depending on various factors such as insulation state of the human body.

In order to devise useful probing signals in light of the wide range of possible human body resistance or impedance values, probing signals of an adequate magnitude that would result in noticeable responses from the load side would be useful. In order that the probing signals, for example, probing voltage or probing current, can have a sufficiently large magnitude but is still safe to a human user, the probing signal source may be an adaptive signal source which is to generate probing signals of a magnitude or magnitude according to the load side electrical conditions.

In some examples, a safe probing voltage that would result in a safe probing current may be used, for example, initially when determining initial body impedance or initial body resistance. It is noted that a probing voltage which is between 10 v to 36 v is a reasonably safe probing voltage range, at least initially when the human body resistance or impedance values is not known. In some examples, a plurality of probing voltages selected within the safe probing voltage range is used. For example, to determine the initial resistance and impedance, and/or their change in response to change in voltage and frequency. In some examples, probing voltages of 10V, 15 v and 25 v are selected to provide a large or sufficient difference in probing voltages within the safe probing voltage range.

In some example, the probing signal is in the form of a square pulse train. A probing signal comprising a train of square pulses is advantageous since a square wave is easier to generate and comprises a plurality of signal frequencies of different magnitudes so that a single train of square probing pulses can be used to replace a plurality of probing signals of different frequencies and/or different magnitudes.

To utilise the voltage responsive variation properties, the probing signal source may set to transmit a probing signal comprising a plurality of probing voltages and the collected responsive signals are analysed to determine whether the trend of the responsible signals is consistent with the expected trend of decreasing impedance and/or decreasing resistance with increasing voltage, and/or asymptotic impedance or asymptotic resistance; and/or whether the fall is within limits of expected response. In example applications, voltages of 10 v, 18 v and 25V are used.

To utilise the impedance variation properties, transmit a probing signal comprising a plurality of probing frequencies and the collected responsive signals are analysed to determine whether the trend of the responsible signals fall within limits of expected response, for example, decreasing impedance with increasing frequency indicative of capacitive properties. For example, a fall of impedance value of more than 50% between 50 Hz and 500 Hz, or between 100 Hz and 1000 Hz may be indicative of human properties. In example applications, frequencies of 50 Hz, 500 Hz and 2 kHz are used.

In addition to variation properties, the probing signal may also be used to determine whether an impedance of a human body is likely to be present. For example, the human resistance is about 500Ω to 1000Ω and detection of resistance or impedance in this range may attract particular attention for further check before power is supplied.

One or a plurality of the variable characteristic electrical properties of a human or living body is utilised to help or to facilitate determination of whether there is direct electrical body contact of a human or living body on the load side. Direct electrical body contact of a human or living body on the load side is undesirable since it can result in hazardous electrical shock when the power source is strong enough. Direct electrical body contact herein includes non-insulated or bare skin contact. The characteristic electrical properties may include one that is variable or invariable in response to variation in electrical signals. Variation in electrical signals includes variation in frequency, variation in current, and variation in voltage.

The plurality of human characteristic responses may include the following variable electrical characteristics: frequency variable or frequency dependent resistance and impedance, voltage variable or voltage dependent capacitance, time variable or time dependent resistance and impedance, time variable or time dependent capacitance, time variable or time dependent current density.

The human characteristic responses include at least one of the following variable electrical characteristics: a significant or substantial decrease of resistance with an increase in probing voltage in at least a range of probing voltages, a significant or substantial decrease of impedance with an increase in probing voltage in at least a range of probing voltages, a significant or substantial decrease of resistance with an increase in probing frequency in at least a range of probing frequencies, a significant or substantial decrease of impedance with an increase in probing frequency in at least a range of probing frequencies, and a significant or substantial decrease of current or current density with increase in probing time.

The range of probing voltages may be between 10 volt and 200 volt, for example, 10 or 20 volt to 100 or 200 volt, 10 or 20 volt to 50 volt, or a range which is formed by a combination of any of the following probing voltages: 10, 15, 20, 25, 30, 35, 40, 45, 50, 55, 60 volt. Where the voltage is above say 36 volt, a shorter probing time is preferred to mitigate in advertent shock. The voltage herein may be direct current voltage or root-mean square alternating current voltage. Probing voltages of 10V, 18V and 25V are useful examples.

The probing frequency range may be a range that is between 25 Hz to 30 kHz, including 20 Hz or 25 Hz to 100 Hz, 150 Hz, or 20 kHz and 20 Hz or 25 Hz to 2 kHz, or a range which is formed by a combination of any of the following probing frequencies: 20 Hz, 50 Hz, 100 Hz, 150 Hz, 200 Hz, 300 Hz, 400 Hz, 500 Hz, 1 kHz, 1.5 kHz, 2 kHz, 2.5 kHz, 3 kHz, 5 kHz, 10 kHz, 15 kHz, 20 kHz, 25 kHz, and 30 kHz.

The probing time may have a range of between 10 ms to 1 second, between 10 ms to 100 or 200 ms or higher. For example, the probing time may extend to several seconds if there is initial doubt on whether there is living body contact. A probing time of between 20 ms to 50 ms, or 100 ms or 200 ms, is preferred for typical applications.

The human characteristic responses may include one or more of the following variable electrical characteristics: a more rapid rate of decrease of resistance and/or impedance with increasing probing voltages at lower probing voltages than higher probing voltages, a more rapid rate of decrease of impedance with increasing probing frequencies at lower probing frequencies than higher probing frequencies, asymptotic impedance for probing frequencies above 2 kHz to 5 kHz or below 25 Hz, a more rapid rate of decrease of impedance with increasing probing frequencies at lower probing voltages than higher probing voltages, and a more rapid rate of decrease of impedance in the initial 10 seconds than after the first 10 seconds.

The power supply control device may comprises a probe signal source which is operable by the controller to transmit at least one type of probing signal to the load side, and a load monitor which is to monitor a plurality of responsive signals on the load side, the responsive signals including, for example, responsive voltages and responsive currents at different times, and the controller is to operate the probe signal source to transmit the probing signal to the load side when the power connection path is in the high impedance state and to collect and evaluate responsive signals through the load monitor, the responsive signal being a signal generated on the load side in response to the probing signal.

To help determine whether there is direct bodily contact on the load side, the load side is monitored and one or a plurality of electrical signals is collected from the load side to determine whether one or a plurality of characteristic variable electrical properties of a human or living body is present on the load side. The electrical signals to be collected may be one or a plurality of responsive signals generated in the load side in response to a testing signal or a probing signal sent to the load side. The responsive signals may include a plurality of voltage signals and/or a plurality of current signals taken during the probing time.

If the one or a plurality of responsive signals contain a sign or signal indicating possible direct bodily contact of a human or living body is detected on the load side, supply of operation power to the load side is likely to be hazardous and no operation power is to be supplied to mitigate risks of electrical shock.

If the one or a plurality of responsive signals contain no sign or signal indicating possible direct bodily contact of a human or living body is detected on the load side, the risks of electrical shock is considered to be low and supply of operation power to the load side will be permitted.

In addition to detection of possible direct bodily contact on the load side, additional safe operation conditions on the load side may be detected and utilised as additional safety measures.

For example, if open-circuit or short-circuit is detected on the load side, the load side would be classified respectively as in a non-operational state and an in an un-acceptable state and no operation power will be supplied. If impedance on the load side does not correspond to or match an expected or a target impedance or impedance range where the power supply control device is for a designated, specific or target application, the load side would be classified as in an un-safe state and no operation power will be supplied.

To help determine whether one or a plurality of characteristic electrical properties of a human or living body is present on the load side, one or a plurality of testing or probing signals may be sent to the load side and one corresponding or a plurality of corresponding responsive signals are collected from the load side for evaluation and subsequent determination.

An example testing or probing signal may be one which is set to produce simulated electrical signals having a variation in electrical properties, for example, variation in signal frequency, variation in signal current, or variation in signal voltage.

The testing or probing signal is transmitted to the load side and a responsive signal generated in response to the probing signal is collected for evaluation and determination. If the collected responsive signals contain information representative of a characteristic electrical property of human bodies, there is a strong indication that direct bodily contact is likely and flow of operational current is not to be allowed.

Mains power supply (or 'mains power' or 'main supply' in short) herein means the general-purpose alternating-current (AC) electric power supply which is also known as household power, household electricity, house current, power-line, domestic power, wall power, line power, AC power, city power, street power, grid power, etc. Most mains power in the world either operate at a standard frequency of 50 Hz (Europe) or 60 Hz (US) sinusoid.

Electrical appliances typically comprise electrical circuit assemblies which are connected to the load side of a power source to obtain operation power. The electrical circuits of modern electrical appliances are complex and their electrical properties or electrical characteristics as an electrical load are non-constant, but can be variable according to operation time and/or operation states.

The electrical conditions of an appliance as an electrical load may vary according to the specific operation state in which the electrical appliance ("appliance" in short) is operating. The pertinent operation states of typical electrical appliances may be classified to comprise:
1) Power-up state.
2) Steady state.
3) Switching state.

The power-up state, also known as the start-up state or warm state, is an operation state when an appliance begins operation from a cold state. A cold state herein means the electrical circuits of the electrical appliance are not under electrical pre-bias to prepare for a quick start up of operation. The cold-state is a state in contrast to a standby state in which the electrical circuits of the electrical appliance are under electrical pre-bias to prepare for a quick start up of operation. A stand-by current flows through an electrical appliance to prepare it for a quick start when in the stand-by state. A standby state is also referred to as a standby mode.

Many electrical appliances have a substantially higher start-up current at the power-up state, compared to the rated current which is the operating current in the steady state. Example start-up current may be between three to five, sometimes up to ten, times the rated current, which is also referred to as the normal rated operating current. The initial or power up current appears as a surge current. The start-up current of some electrical appliances is spiky and appears as a current surge compared to their rated current.

When an electrical appliance begins operation from a cold state, the initial current, also known as power up current or cold start current, may appear as a current surge and the operation current will gradually subside to or towards a steady-state current. The change from a spiky current to the rated current represents a transition from the cold state to the cold start state and then the steady state. A stand-by mode is classified as a steady-state mode in this disclosure. When in the stand-by mode, the appliance is in a warm-state and is ready for steady-state operations.

The difference between the current amplitudes between starting from a stand-by mode start to the steady-state mode is substantially smaller than that between starting from a cold mode to the steady-state mode.

Example appliances may operate in a plurality of steady-states. For example, an appliance may operate in a plurality of steady states according to load requirements, user selection, schedules, etc. The switching between various steady-states may be automatic according to instantaneous sensor feedbacks, according to pre-determined time schedules, by user control or election, or according to other criteria or means without loss of generality.

Appliances may be classified according to expected use conditions. For example, electrical appliances such as hair dryers, hand blowers, vacuum cleaners, washing machines, may be classified as a short-use duration appliance. Appliances such as refrigerators, computer servers, air conditioners and lighting equipment may be classified as a long-duration appliance.

Appliances may be classified according to their load current characteristics, which represent electrical load characteristics of the appliances. For example, appliances may be classified into the below example load types when connected to an alternating current (AC) power source:
1) AC load.
2) DC load.
3) Complex load.

A typical AC source is an AC voltage source at 50 Hz or 60 Hz.

An AC load operatively connected to an AC power source has a sinusoidal load current characteristic.

An AC load may have a half-wave load current, which is typical of a half-rectified circuit comprising a diode. A half-wave load current herein means that the load current follows the sinusoidal shape of the upper cycles of a sinusoid and has zero current during the negative cycles of the sinusoidal AC source voltage.

An AC load may have phase angle cutting characteristics, which are typical of the presence of a phase-fired controlled (PFC) device. Phase-fired control, also referred to as phase cutting or "phase angle control", is a method for power limiting, applied to AC voltages. The method works by modulating an AC source voltage using a thyristor, SCR, triac, thyratron, or other such gated diode-like devices into and out of conduction at a predetermined phase of the applied waveform.

A DC load herein means a load which is operated by a DC power and the load includes a built-in AC to DC power converter. The DC load has bell-shaped current pulses which peak and trough at the same time respectively as the peaks and troughs of the corresponding sinusoids of the AC source sinusoids, while having a substantially shorter conduction period compared to the AC period. Resistive loads and DC motors are example of complex loads. The bell-shaped pulses are characteristics of a power capacitor of the AC/DC converter. Switching mode power supplies are a common example of AC/DC converters.

A complex load does not have a sinusoidal load current when operatively connected to an AC voltage source of a typical mains supply, but the load current has characteristic harmonic frequencies characteristic of the load. Refrigerators are an example of complex loads.

Load Current Monitoring

In example embodiments, a load monitor may be connected to the load to monitor load current conditions and a controller is to operate the load monitor to capture an example plurality of load current samples for determination of load current properties and/or load current characteristics. The load current samples may be samples of load current amplitudes with respect to time. The captured current amplitude and time data may be stored in a storage device of the monitor circuit. The storage device may comprise volatile memory devices such as RAM and non-volatile memory devices such as flash memories. A controller, for example, an integrated circuit or solid-state microprocessor-based controller is to operate to analyze the captured current and time to determine the load current properties and load current characteristics at materials times.

An example load current monitor comprises a current sensor which is connected across the first input terminal A and a second input terminal com, as depicted in FIG. 4. The current monitor is for monitoring current which flows through a load, which is connected to an AC power source, and the AC power source comprises a live terminal L and a neutral terminal N. The current sensing path comprises a low resistance path formed by a fusible link and a current sensing resistor. The current sensing resistor has an example very low resistance of $0.01\Omega$ and the example fusible link has an example fusing rating of 5 A. The current which flows through the current sensing resistor is monitored by a resistor ladder network. The resistor ladder network comprises a first terminal which is connected to a first terminal of the current sensing resistor and a second terminal which is connected to a negative input terminal of an amplifier LTC1050. The resistor ladder network comprises a plurality of switchable resistor links to control gain of the voltage amplifier. The positive input terminal of the voltage amplifier LTC1050 is tied to a reference voltage, which in the present example embodiment is set to be at 1.6V by a set of biasing resistors when the amplifier output is to swing between 0 and 3.3 volt when the power supply to the load current monitor is at 5V DC. The current monitor comprises a third input terminal which is for connection to the live terminal of the AC voltage to monitor the AC supply voltage. The load current monitor comprises a first output terminal which is an output terminal of the voltage amplifier. The load current monitor comprises a second output terminal which is a line voltage terminal V for outputting the AC line voltage, down converted. The load current monitor comprises a third output terminal zero which is a reference voltage terminal for outputting voltage at the com terminal or the neutral terminal. The first input terminal A is connected to an upstream end of the low resistance path and the second terminal com is connected to the neutral terminal of an AC source and the downstream end of the low resistance path.

The load characteristics of some appliances change according to the operation states. In example embodiments, load characteristics are determined during different operation states and the outcomes of determination may be used as stand-alone criteria or in combination.

AC Load

For example, the load current, for example of an AC load, during an initial plurality of AC cycles after cold-start-up may be monitored and measured during the power-up state.

In example operations, the controller is to execute stored instructions to capture load current samples during the initial plurality of AC supply cycles, for example, during the initial 5-10 cycles. After load current samples have been captured and stored, the controller is to determine whether the load current has a sinusoidal waveform and, if so, whether the load current is a full-sinusoid, a half-sinusoid, or a phase angle cut sinusoid. In addition, the peak currents are measured. The peak currents to be measured include the peak current of the first and subsequent peaks which correspond to the first AC supply cycle and subsequent AC supply cycles immediately following the first AC supply cycle. The measured peak currents are then evaluated to determine whether the peak currents are constant (for example, code=0 to represent constant), whether the peak currents change towards a constant peak (for example, code=1 to represent tending to constant), or whether the peak current fluctuates (for example code=2 to represent keep on changing). In addition, power factors of the load current are measured. Where the peak current is non-constant, the values of the peaks are captured and recorded.

The parameters of an AC load at start-up state operations may be characterized by a plurality of parameters. Example selected parameters which are representative and which are to be measured or monitored are set out in Table 3 below.

TABLE 3

| 1 | 2 | 3 | 4 | 5 | 6 |
|---|---|---|---|---|---|
| AC Load (Code = 0) | First Peak | Full wave (Code = 0) | Constant (Code = 0) | Peak | power factor |
|  |  | Half/Full wave (Code = 1) | Changing but trends to constant (Code = 1) | Max. peak Mix. peak | power factor |
|  |  | Phase cutting (code = 2) | Keep on changing (Code = 2) | Max. peak Mix. peak | power factor |

The measured properties of a 100 W tungsten lamp as an example AC load are set out in Table 4 below.

TABLE 4

| 1 | 2 | 3 | 4 | 5 * | 6 |
|---|---|---|---|---|---|
| 0 (=Sine Wave) | 2169 | 0 (=Full Wave) | 0 (=Constant) | 1565 to 1747 | 1 |

Example load current responses of the lamp are depicted in FIG. 5A.

The measured properties of an AC motor-driven fan as an example AC load are set out in Table 5 below.

TABLE 5

| 1 | 2 | 3 | 4 | 5* | 6 |
|---|---|---|---|---|---|
| 0 (=Sine Wave) | 2047 | 0 (=Full Wave) | 0 (=Constant) | 1488 to 1808 | 1 |

The asterisk symbol * herein means current values are expressed in term of mA or micro-controller measuring unit where appropriate.

Example load current responses of the fan are depicted in FIG. 5B.

In example embodiments, the example appliance comprises a zero-start controller which detects zero-crossing and controls the supply of AC power to the appliance to begins at zero-crossing of the AC supply voltage.

Example load current responses of a light-wave oven having a phase angle cutting device are depicted in FIG. 5B.

In FIGS. 5A and 5B, the horizontal or long axes are time axes and the vertical or short axes are voltage or current values. The waveforms having a larger amplitude are the AC supply voltage and the one having a smaller amplitude are the load current. The AC supply voltages in FIGS. 5A and 5B have an apparent 180 degree phase shift due to polarity of the output circuit of the monitor circuit of FIG. 4.

Switching States

Where an appliance is switchable to operate in a plurality of alternative operating states, parameters in relation to the plurality of alternative operating states may be measured and recorded.

TABLE 6

| 1 | 2 | 3 |
|---|---|---|
| State number | Switching time up, down (maximum, ms) | Peak current |

In some embodiments, the below example selected parameters in relation to the plurality of alternative switching states may be measured and recorded.

TABLE 7

| 1 | 2 | 3 | 4 |
|---|---|---|---|
| Switching state | Switching time (maximum, in ms) | Peak current 1 (max, if changing) | Peak current 2 (max, if changing) |

A first switching state means an appliance is being switched from a first operation state to a second operation state or vice versa. The peak current values are peak current of the relevant operating states.

An example motor-driven fan, for example a GREE™ Model FB-3003 50 Hz 40 W, 300 mm blade, has three operation speeds, corresponding to three operating states 1, 2, and 3. The first switching state represents switching between operation states 1 and 2, while the second switching state represents switching between operation states 2 and 3.

Example switching states of the example fan are set out in Table 8 below.

TABLE 8

| Switching state no. | 2 | 3* | 4* |
|---|---|---|---|
| 1 | 1 sec (manual control, normally <1 sec) | 137 | 140 |
| 2 | 1 sec (manual control, normally <1 sec) | 137 | 169 |

In the above Table, item 3 represents the peak current (mA or microcontroller units) at a lower power state while item 4 represents the peak current of a higher power state.

Steady-State

The parameters of an appliance at steady-state operations may be characterized by a plurality of parameters, for example, the peak current (including maximum peak current and minimum peak current if the peak current changes from a maximum to a minimum).

In example embodiments, the parameters are set out in Table 9 below.

TABLE 9

| 1 | 2 | 3 | 4 |
|---|---|---|---|
| Steady state Number | Max peak | Min peak | Power factor |

Table 10 below are measured parameters for the example tungsten lamp.

TABLE 10

| 1 | 2* | 3* | 4 |
|---|---|---|---|
| 1 | 435 mA (rms) | 431.7 mA (rms) | 1 |

Table 11 below are measured parameters for the example 300 mm blade fan.

TABLE 11

| 1 | 2 | 3 | 4 |
|---|---|---|---|
| 1 | 127 mA (rms) + 10 mA(rms) slewing | 114.5 mA (rms) | 1 |
| 2 | 130 mA (rms) + 10 mA(rms) slewing | 124.4 mA (rms) | 1 |
| 3 | 159 mA (rms) + 10 mA(rms) slewing | 152.9 mA (rms) | 1 |

DC Load

Start-Up

Where the load is a DC load, the controller is to execute stored instructions to capture load current samples during the initial plurality of AC supply cycles, for example, during the initial 5-10 cycles. After load current samples of the start-up stage have been captured and stored, the controller is to determine whether the load current is a DC load as described herein.

Example load current responses of a fan as a DC load are depicted in FIG. 6A.

The typical load current waveform referred to the input side versus an AC supply voltage for a DC load is depicted in FIG. 6B.

The controller will then measure pertinent parameters characteristic of operation during the start-up stage. Example pertinent parameters of this start-up stage are set out in Table 12 below.

TABLE 12

| 1 | 2 | 3 | 4 | 5 | 6 |
|---|---|---|---|---|---|
| DC Load (Code = 1) | Peak max (first cycle) | Peak max (last cycle) | Current in rms (Last cycle) | Average Real Power (Last cycle) | Apparent Power (Last cycle) |

The first parameter Table 12 is a number indicating the type of the load, the second parameter is the peak current of the first cycle during startup, the third parameter is the peak current of the last start-up AC supply cycle, which is the $10^{th}$ AC cycle after start-up in this example, the fourth to the sixth parameters are, respectively, rms current, average real power and the apparent power.

Power factor is calculated as follows:

$$\text{Power Factor} = \frac{\text{Average Real Power over a full cycle}}{\text{Apparent Power over a full cycle}}$$

Where,

Average Real Power over a full cycle =

$$\frac{\text{Instantaneous Voltage} \times \text{Instantaneous Current}}{\text{Number of samples during the instant samples taken}},$$

Apparent Power over a full cycle=Vrms*Irms,
Irms=the RMS current flow through the load over a full cycle, $$= \sqrt{\frac{\text{sum of sample current}^2}{\text{Number of current samples}}}$$

Vrms=the RMS voltage across the load over a full cycle.

$$= \sqrt{\frac{\text{sum of sample } volatge^2}{\text{Number of voltage samples}}}$$

The duration T of an AC cycle for an AC system having a frequency f is 1/f, and the duration per AC cycle is 20 ms for a 50 Hz AC system without loss of generality.

Switching State

The parameters of a DC load during switching-state operations may be characterized by a plurality of parameters. Example pertinent switching-state parameters are selected as the same as those for AC load, and the parameters are incorporated herein by reference.

Steady-State

The parameters of a DC load during steady-state operations may be characterized by a plurality of parameters. Selected example parameters suitable for characterizing steady-state operations are set out in Table 13 below.

TABLE 13

| 1 | 2 | 3 | 4 | 5 | 6 | 7 |
|---|---|---|---|---|---|---|
| Sub-state | Max I peak | Min I peak | Max I r.m.s. | Min I r.m.s. | Power factor | PF variation |

The first parameter is the number indicating the sub-state within the steady state.

The second and third parameters set the maximum and minimum allowable peak current value during the steady state and defines an acceptable range of peak currents.

The fourth and fifth parameter set the maximum and minimum allowable rms current value during the steady state.

The sixth parameter is the power factor during the steady state.

The seventh parameter is the variation allowed for the power factor of the sixth parameter. This number should be between 0 to 1. A variation in power factor is observed with load of an appliance changes.

Complex Load

Where a load is a complex load, the load current does not have a sinusoidal waveform nor a waveform of a DC load.

The parameters of a complex load during start-up-state operations may be characterized by a plurality of parameters. Example pertinent parameters of a complex load at the start-up-state are selected and set out in Table 14 below.

TABLE 14

| 1 | 2 | 3 | 4 | 5 |
|---|---|---|---|---|
| Complex Load (Code = 2) | First peak | Last peak | Average Real Power of the last cycle | Apparent Power of the last cycle |

The first parameter is the number indicating the type of the load. The second parameter is the maximum peak current in the first AC supply cycle during startup. The third parameter is the peak current of the last ($10^{th}$) cycle during startup, since the load monitor is to read for 10 cycles to determent the start-up state parameters, the $10^{th}$ cycle is the last cycle of the determination. The fourth and fifth parameter are respectively the average real power and the apparent power of the last cycle of the first read, say the $10^{th}$ cycle.

The parameters of a complex load during switching-state operations may be characterized by a plurality of parameters. Example pertinent parameters of a complex load at switching-state are selected and set out in Table 15 below.

TABLE 15

| 1 | 2 | 3 | 4 |
|---|---|---|---|
| Switching Number | Switching time in ms (maximum) | Peak 1 (max) | Peak 2 (max) |

The first parameter indicates the switching state number. The second parameter indicating a short period of cut-off time or unstable state during switching, and this period is in milliseconds to allow the appliance to transition to the next state. Parameter 3 and 4 represent the current peaks in two switching states.

The parameters of a complex load during steady-state operations may be characterized by a plurality of parameters. Example pertinent parameters of a complex load at steady-state are selected and set out in Table 15 below.

TABLE 15

| 1 | 2 | 3 | 4 | 5 |
|---|---|---|---|---|
| Steady state Number | Max peak | Min peak | Average Real Power | Apparent Power |

In some embodiments, the frequency contents of the load current are obtained by using Fast Fourier Transforms (FFT), and the characteristic frequency spectrum of the load current is stored as pertinent parameters.

The same symbols and conventions are used herein where appropriate unless the context requires otherwise or unless specified.

In example embodiments, a load monitor apparatus is to execute stored instructions to operate the load monitor circuit to monitor load-side conditions and to determine whether the connected appliance is fit for operation. The load monitor circuit may comprise the load current monitor circuit of FIG. 4, which may be incorporated or built-in as part of the load monitor 120 of FIG. 1, and the device, including the load monitor 120, of FIG. 2A may also function as the load monitor apparatus.

The appliance may have an identification code which is stored on the appliance. For example, the identification code may be stored in a data storage device, such as a non-volatile memory, of the appliance or stored in an RFID tag attached to the appliance. Where the identification code is stored in a data storage device on the appliance, the appliance may comprise a data communication frontend to facilitate export of the identification code. The data communication frontend may be wired data communication port or a wireless data communication frontend.

When the appliance is to request for power supply, the load monitor apparatus, or more specifically the controller or the load monitor apparatus, is to obtain the identification code of the appliance. An appliance may be treated as to request for power when the appliance is first connected to the power source or when a connected appliance is switched on from an off-state.

After the identification code of the appliance has been obtained by the load monitor apparatus, the controller is to retrieve stored electrical characteristics of the appliance with reference to the identification code. The electrical characteristics, for example, comprising the pertinent parameters hereinabove, are pre-stored in databases of stored electrical characteristics of appliances. The databases may be stored on-board the load monitor apparatus or outside. Where the databases are stored outside of the load monitor apparatus, the load monitor apparatus may retrieve the stored electrical characteristics through its data communication frontend, as depicted in FIG. 8.

During operations of the appliances, the load monitor apparatus is to compare the retrieved pertinent parameters and the real time measured data and to determine whether the appliance is fit for operation.

In example embodiments, the database may include a white list, a grey list and a black list. A white list may contain electrical characteristics of a plurality of appliances which is approved for immediate connection, together with their pertinent parameters. A black list may contain identification numbers of a plurality of appliances which are prohibited from connection. A grey list may contain types of appliances which are not prohibited from connection or partial parameters, subject to verification of their pertinent electrical characteristics and parameters.

The databases may be contributed by manufacturers and assembled as centralized databases.

The databases may be contributed by end-users and saved on the load monitor apparatus.

The databases may follow the formats of the pertinent parameters set out herein as examples, but other formats are of course possible.

To build the databases, sample electrical appliances of various types and associated electrical characteristics are measured and stored as reference data for subsequent use. Due to variation and tolerances, ranges of associated electrical characteristics are measured may be included in the database so that the load monitor apparatus may determine whether the electrical characteristics and parameters are within an acceptable range or ranges representing fitness for operation. For example, an appliance may be fit for operation when new but its electrical characteristics and parameters degrade to outside the acceptable range or ranges and become no longer fit for operation. When the load monitor apparatus has determined that the electrical characteristics and parameters of an approved appliance are no longer with an acceptable range representing fit for operation, the specific appliance having a specific identification number will become black listed, locally or centrally.

The load monitor apparatus may include a set of local databases of frequently used appliances to expedite approval for power connection.

As the electrical characteristics and pertinent parameters of various appliances can fluctuate within a reasonable range, a manufacture may define acceptable range or ranges of the electrical characteristics and parameters of appliances, for example, by measuring the electrical characteristics and parameters of a pool of samples of appliances.

Where an appliance has no identification number or has an identification number which is not on the databases, the load monitor apparatus may include an option for a user to selectively approve an appliance by going through initial measurements to measure the operating electrical characteristics and parameters at one or all or the operations states and to determine whether the appliance should be approved for power connection. The measured operating electrical characteristics and parameters of an approved appliance are then stored locally for future reference. Where the appliance has no built-in identification number, the approval procedure may be repeated every time when the appliances makes a request for power connection. Where an appliance has an identification number which is not previously stored in the databases, the databases may be updated with the new identification number and the associated electrical characteristics and parameters as those of an approved appliance.

In example embodiments, a plurality of load monitor apparatus is connected separately to a plurality of individual power outlets. The updated local databases may be distributed to the plurality of load monitor apparatus within the locality for use by the plurality of load monitor apparatus within the same locality. A locality may be a home, an office, a building or a street without loss of generality.

In some embodiment, each locality may have a centralized load monitor apparatus which controls operation of a plurality of power outlets and the databases of pertinent electrical characteristics and parameters of approved appliances of the locality are stored on the centralized load monitor apparatus.

The identification number may be specific to individual appliances so that each appliance can be uniquely identified by its identification number. The identification number may include a serial number of an appliance, which is assigned for example by manufacturer.

The identification number may include a code portion to represent the load type. For example, an identification number may include a type code portion which indicates whether the appliance is an AC load (for example, type code=0), a DC load (for example, type code=1), a complex load (for example, type code=2) etc.

The pertinent or reference electrical characteristics and parameters may be stored according to the operations state. For example, the power-up state may be given a state-code of 0, the switching-state may be given a state-code of 1, and the steady-state may be given a state-code of 2. The switching-state may have a two-digit format to provide space for sub-switching states.

In operation, the load monitor apparatus may monitor the operation electrical characteristics and parameters at each and/or every operation state. If the measured electrical characteristics and parameters commensurate with the pre-stored reference electrical characteristics and parameters, the load monitor apparatus is to determine that the connected appliance is fit for operation and power connection is to continue. Otherwise, the power connection is to cease and an alert or alarm may be generated to attract user or security attention.

While the disclosure is made with reference to example and embodiments, it should be appreciated that the embodiments and example herein are to facilitate better understanding and are not intended to be restrictive.

The invention claimed is:

1. A power supply control apparatus comprising a controller, a load current monitor and power connection circuitry operable by the controller for controlling power supply from a power source to a load, wherein the power connection circuitry comprises a switchable power connection path between a source side and a load side, and the power connection path is switchable to operate in a first operation state or an on-state in which state impedance between the source side and the load side is very low to permit flow of operation current from the power source to the load through the power connection path, or a second operation state or an off-state in which state impedance between the source side and the load side is very high to impede flow of operation current through the power connection path; wherein the controller is to operate to receive an identification number from a load and to use the identification number to retrieve a set of stored reference electrical parameters of the load from a set of databases, to measure operational electrical parameters of the load, to compare measured electrical parameters with the reference electrical parameters, and to determine whether the load is fit for power supply with reference to outcome of comparison between the measured electrical parameters and the reference electrical parameters.

2. The apparatus of claim 1, wherein the controller is to operate to detect or receive an identification number from a load upon detection of signals representing the load making a request for power supply.

3. The apparatus of claim 1, wherein the set of stored reference electrical parameters of the load comprises operational electrical parameters of a reference load in a plurality of operation states, and the controller is to operate the load current monitor to measure operational electrical parameters of the load during the plurality of operational states, and to compare measured operational electrical parameters with the stored operational electrical parameters of a reference load of the plurality of operational states, and to generate a signal to indicate whether the load is fit for power supply according to outcome of comparison.

4. The apparatus of claim 3, wherein the plurality of operation states comprises a power-up state and a steady state.

5. The apparatus of claim 4, wherein the operational electrical parameters of the load to be measured during the power-up state include peak current amplitude at the first and subsequent cycles of the power supply.

6. The apparatus of claim 4, wherein the plurality of operation states comprises a switching state, the switching state comprising a plurality of switchable states, and wherein the reference operational electrical parameters of a first switchable state comprise operational electrical parameters of the first switchable state and operational electrical parameters of a second switchable state.

7. The apparatus of claim 1, wherein the load is classified into a plurality of load types, the load types comprising an AC load, a DC load and a complex load; and wherein the controller is to operate to measure and determine the operational electrical parameters of the load according to the load type of the load.

8. The apparatus of claim 6, wherein the identification number comprises information on the load type of the load, and wherein the controller is to operate to measure the operational electrical parameters of the load according to the load type contained in the identification number.

9. The apparatus of claim 1, wherein the identification number comprises a serial number of an appliance and each appliance has a unique pre-assigned serial number.

10. The apparatus of claim 1, wherein the reference operational electrical parameters include one or more of peak current, peak currents, peak current range, first cycle peak current at start-up, power factor, power factor variation, power factor range, switching time, real power, apparent power.

11. The apparatus of claim 1, wherein the databases contain a list of black listed identification numbers and a load having a black-listed identification number is prohibited from receiving power supply.

12. The apparatus of claim 1, wherein the databases contain a list of white listed identification numbers and a load having a black-listed identification number is to receive power supply from the power source after a request for power supply has been acknowledged by the controller; and wherein the controller is to monitor the operational electrical parameters of the load after power supply to the load has begun.

13. The apparatus of claim 12, wherein the controller is to operate the load current monitor to measure operational electrical parameters of the load during a plurality of operational states, and to compare measured operational electrical parameters with the stored operational electrical parameters; and wherein the operational electrical parameters to be measured at different operational states are different.

14. The apparatus of claim 12, wherein the controller is to operate the load current monitor to measure operational electrical parameters of the load, and the measure operational electrical parameters of the load include peak currents and their trend of change.

15. The apparatus of claim 1, wherein the controller is to operate to measure operational electrical parameters of the load when the controller fails to receive an identification number from the load and or when the received identification number is an unregistered identification number which fails to return a set of stored reference electrical parameters from the databases, and wherein the controller is to compare measured electrical parameters with a set of pre-stored reference electrical parameters, to determine whether the load is fit for power supply with reference to outcome of comparison between the measured electrical parameters and the reference electrical parameters, and to operate the power connection circuitry to supply operation power to the load upon detection of a successful outcome of comparison.

16. The apparatus of claim 15, wherein the load has an unregistered identification number controller and the controller is to save the unregistered identification number to become a registered identification number and to save the measured electrical parameters as reference electrical parameters associated with the registered identification number.

17. A method of a controller operating a power supply control apparatus to control flow of power from a power source to a load, wherein the power supply control apparatus comprises a load current monitor and power connection circuitry operable by the controller, wherein the power connection circuitry comprises a switchable power connection path between a source side and a load side, and the power connection path is switchable to operate in a first operation state or an on-state in which state impedance between the source side and the load side is very low to permit flow of operation current from the power source to the load through the power connection path, or a second operation state or an off-state in which state impedance between the source side and the load side is very high to impede flow of operation current through the power connection path; wherein the method comprises the controller executing stored instructions to receive an identification number from a load, to use the identification number to retrieve a set of stored reference electrical parameters of the load from a set of databases, to measure operational electrical parameters of the load, to compare measured electrical parameters with the reference electrical parameters, and to determine whether the load is fit for power supply with reference to outcome of comparison between the measured electrical parameters and the reference electrical parameters.

18. The method of claim 17, wherein the controller is to operate to detect or receive an identification number from a load upon detection of signals representing the load making a request for power supply.

19. The method of claim 17, wherein the set of stored reference electrical parameters of the load comprises operational electrical parameters of a reference load in a plurality of operation states, and wherein the controller is to operate the load current monitor to measure operational electrical parameters of the load during the plurality of operational states, and to compare measured operational electrical parameters with the stored operational electrical parameters of a reference load of the plurality of operational states, and to generate a signal to indicate whether the load is fit for power supply according to outcome of comparison.

20. The method of claim 19, wherein the plurality of operation states comprises a power-up state and a steady state; and wherein the controller is to measure different operational electrical parameters of the load at the power-up state and at the steady state.

\* \* \* \* \*